United States Patent
Sambongi et al.

(10) Patent No.: US 7,760,962 B2
(45) Date of Patent: Jul. 20, 2010

(54) IMAGE CAPTURE APPARATUS WHICH SYNTHESIZES A PLURALITY OF IMAGES OBTAINED BY SHOOTING A SUBJECT FROM DIFFERENT DIRECTIONS, TO PRODUCE AN IMAGE IN WHICH THE INFLUENCE OF GLARE FROM A LIGHT IS REDUCED

(75) Inventors: Masao Sambongi, Hachioji (JP); Keiichi Sakurai, Akishima (JP)

(73) Assignee: Casio Computer Co., Ltd., Tokyo (JP)

( * ) Notice: Subject to any disclaimer, the term of this patent is extended or adjusted under 35 U.S.C. 154(b) by 1149 days.

(21) Appl. No.: 11/390,808

(22) Filed: Mar. 28, 2006

(65) Prior Publication Data

US 2006/0222260 A1 Oct. 5, 2006

(30) Foreign Application Priority Data

Mar. 30, 2005 (JP) ............................. 2005-099226
Mar. 31, 2005 (JP) ............................. 2005-103402

(51) Int. Cl.
*G06K 9/40* (2006.01)
*G06K 9/00* (2006.01)

(52) U.S. Cl. .................. 382/274; 382/153; 382/154; 382/275

(58) Field of Classification Search .................. 382/115, 382/153–154, 274
See application file for complete search history.

(56) References Cited

U.S. PATENT DOCUMENTS

| | | | | |
|---|---|---|---|---|
| 5,446,549 A | * | 8/1995 | Mazumder et al. | 356/613 |
| 5,488,674 A | * | 1/1996 | Burt et al. | 382/284 |
| 5,631,976 A | * | 5/1997 | Bolle et al. | 382/174 |
| 6,049,625 A | * | 4/2000 | Sakamoto | 382/154 |
| 6,088,470 A | * | 7/2000 | Camus et al. | 382/117 |

(Continued)

FOREIGN PATENT DOCUMENTS

JP  7-276710 A  10/1995

(Continued)

OTHER PUBLICATIONS

Japanese Office Action dated Nov. 17, 2009 and English translation thereof issued in counterpart Japanese Application No. 2005-103402.

(Continued)

*Primary Examiner*—Bhavesh M Mehta
*Assistant Examiner*—Gandhi Thirugnanam
(74) *Attorney, Agent, or Firm*—Frishauf, Holtz, Goodman & Chick, P.C.

(57) ABSTRACT

A digital camera shoots a document plural times from different directions to obtain a plurality of images. An image processing device included in the digital camera corrects the keystone distortion of each image to generate an image which seems as if the document were shot from in front of it. The image processing device synthesizes the images by addition-averaging the pixel values of each pixel in the plurality of corrected images. Even if captured images are illuminated by glare from a light because a document made of glossy paper is shot, the influence of the glare is reduced by addition-averaging the pixel values of each pixel in the plurality of images.

7 Claims, 27 Drawing Sheets

U.S. PATENT DOCUMENTS

| | | | |
|---|---|---|---|
| 6,247,813 B1* | 6/2001 | Kim et al. ................ 351/206 |
| 6,330,345 B1* | 12/2001 | Russo et al. ............... 382/115 |
| 6,363,366 B1* | 3/2002 | Henty ..................... 705/400 |
| 6,434,257 B1* | 8/2002 | Mohan et al. .............. 382/110 |
| 6,668,078 B1* | 12/2003 | Bolle et al. ................ 382/164 |
| 6,718,067 B1* | 4/2004 | Wang ...................... 382/254 |
| 6,898,331 B2* | 5/2005 | Tiana ..................... 382/274 |
| 7,050,501 B2* | 5/2006 | Alvarez ................ 375/240.16 |
| 7,065,242 B2* | 6/2006 | Petrov et al. .............. 382/154 |
| 7,084,900 B1* | 8/2006 | Watanabe et al. ............ 348/94 |
| 7,113,623 B2* | 9/2006 | Chen et al. ................ 382/128 |
| 7,158,099 B1* | 1/2007 | Berube et al. ................ 345/9 |
| 7,346,184 B1* | 3/2008 | Carr et al. ................ 382/100 |
| 7,391,442 B1* | 6/2008 | Fleischman et al. ...... 348/222.1 |
| 7,453,456 B2* | 11/2008 | Petrov et al. .............. 345/419 |
| 7,602,969 B2* | 10/2009 | Yamada et al. ............ 382/167 |
| 2002/0044674 A1* | 4/2002 | Pavlidis .................. 382/118 |
| 2002/0172432 A1* | 11/2002 | Pilu et al. ................ 382/274 |
| 2002/0186221 A1* | 12/2002 | Bell ....................... 345/474 |
| 2003/0118227 A1* | 6/2003 | Winsor et al. ............. 382/132 |
| 2003/0169901 A1* | 9/2003 | Pavlidis et al. ............ 382/103 |
| 2004/0047518 A1* | 3/2004 | Tiana ..................... 382/284 |
| 2004/0170304 A1* | 9/2004 | Haven et al. .............. 382/115 |
| 2005/0012842 A1* | 1/2005 | Miyagawa et al. ...... 348/333.01 |
| 2005/0157931 A1* | 7/2005 | Delashmit et al. .......... 382/190 |
| 2005/0162381 A1* | 7/2005 | Bell et al. ................ 345/156 |
| 2006/0140502 A1* | 6/2006 | Tseng et al. .............. 382/275 |
| 2006/0222260 A1* | 10/2006 | Sambongi et al. .......... 382/274 |
| 2008/0165266 A1* | 7/2008 | Jenkins ................ 348/333.01 |

FOREIGN PATENT DOCUMENTS

| | | |
|---|---|---|
| JP | 08-307657 | 11/1996 |
| JP | 11-203478 | 7/1999 |
| JP | 11-224324 | 8/1999 |
| JP | 2000-125159 A | 4/2000 |
| JP | 2004-080178 A | 3/2004 |
| JP | 2004-320123 A | 11/2004 |

OTHER PUBLICATIONS

Japanese Office Action dated Nov. 19, 2009 and English translation thereof issued in counterpart Japanese Application No. 2005-099226.

* cited by examiner

Pin_2
Pin_1

Pout_2
Pout_1

FIG. 7A $$HI = \begin{pmatrix} Usc & 0 & 0 \\ 0 & Vsc & 0 \\ 0 & 1 & 0 \end{pmatrix} \begin{pmatrix} X1-X0+\alpha \cdot X1 & Y1-Y0+\alpha \cdot Y1 & \alpha \\ X3-X0+\beta \cdot X3 & Y3-Y0+\beta \cdot Y3 & \beta \\ X0 & Y0 & 1 \end{pmatrix}$$

FIG. 7B
$$\begin{cases} \alpha = \dfrac{(X0-X1+X2-X3)(Y3-Y2) - (X3-X2)(Y0-Y1+Y2-Y3)}{(X1-X2)(Y3-Y2) - (X3-X2)(Y1-Y2)} \\ \beta = \dfrac{(X1-X2)(Y0-Y1+Y2-Y3) - (X0-X1+X2-X3)(Y1-Y2)}{(X1-X2)(Y3-Y2) - (X3-X2)(Y1-Y2)} \end{cases}$$

FIG. 7C $$K = \frac{\sqrt{(X3-X0+\beta \cdot X3)^2 + (Y3-Y0+\beta \cdot Y3)^2 + (\beta \cdot F)^2}}{\sqrt{(X1-X0+\alpha \cdot X1)^2 + (Y1-Y0+\alpha \cdot Y1)^2 + (\alpha \cdot F)^2}}$$

FIG. 7D
$$\begin{cases} Usc = \dfrac{U}{VMAX}, \quad Vsc = \dfrac{V}{VMAX} & \text{when } VMAX/UMAX \leqq K \\ Usc = \dfrac{U}{UMAX}, \quad Vsc = \dfrac{V}{UMAX} & \text{when } VMAX/UMAX > K \end{cases}$$

FIG. 8A
$$(X', Y', Z') = (U, V, 1) \cdot HT$$

$$HT = \begin{pmatrix} A11 & A12 & A13 \\ A21 & A22 & A23 \\ A31 & A32 & A33 \end{pmatrix}$$

FIG. 8B
$$X = \frac{X'}{Z'} = \frac{A11 \cdot U + A21 \cdot V + A31}{A13 \cdot U + A23 \cdot V + A33}$$

$$Y = \frac{Y'}{Z'} = \frac{A12 \cdot U + A22 \cdot V + A32}{A13 \cdot U + A23 \cdot V + A33}$$

FIG. 8C
$$Q(U, V) = \frac{Ct(U, V) + P(U, V)}{Ct + 1}$$

FIG. 12A $\quad Q(U,V) = \begin{cases} P(U,V) & \text{when Skf=1} \\ P(U,V) & \text{when Skf=0 and } P(U,V) < Q(U,V) \\ Q(U,V) & \text{when Skf=0 and } P(U,V) \geqq Q(U,V) \end{cases}$ FIG. 12B $\quad Q(U,V) = \begin{cases} P(U,V) & \text{when Ct=0 or } S(P(U,V)) < S(Q(U,V)) \\ Q(U,V) & \text{else} \end{cases}$ FIG. 12C $\quad Q(U,V) = \begin{cases} P(U,V) & \text{when } N(U,V)=0 \cup DS(U,V) < TH\_LOW \\ Q(U,V) & \text{when } N(U,V) \neq 0 \cap DS(U,V) > TH\_HIGH \\ \dfrac{Q(U,V) \times N(U,V) + P(U,V)}{N(U,V)+1} & \text{else} \end{cases}$ FIG. 12D $\quad SE(P,U,V) = \sum_{i=-N}^{N} \sum_{j=-N}^{N} \exp\left(-\dfrac{i^2+j^2}{2\sigma^2}\right) \cdot Y(P(U+i, V+j))$

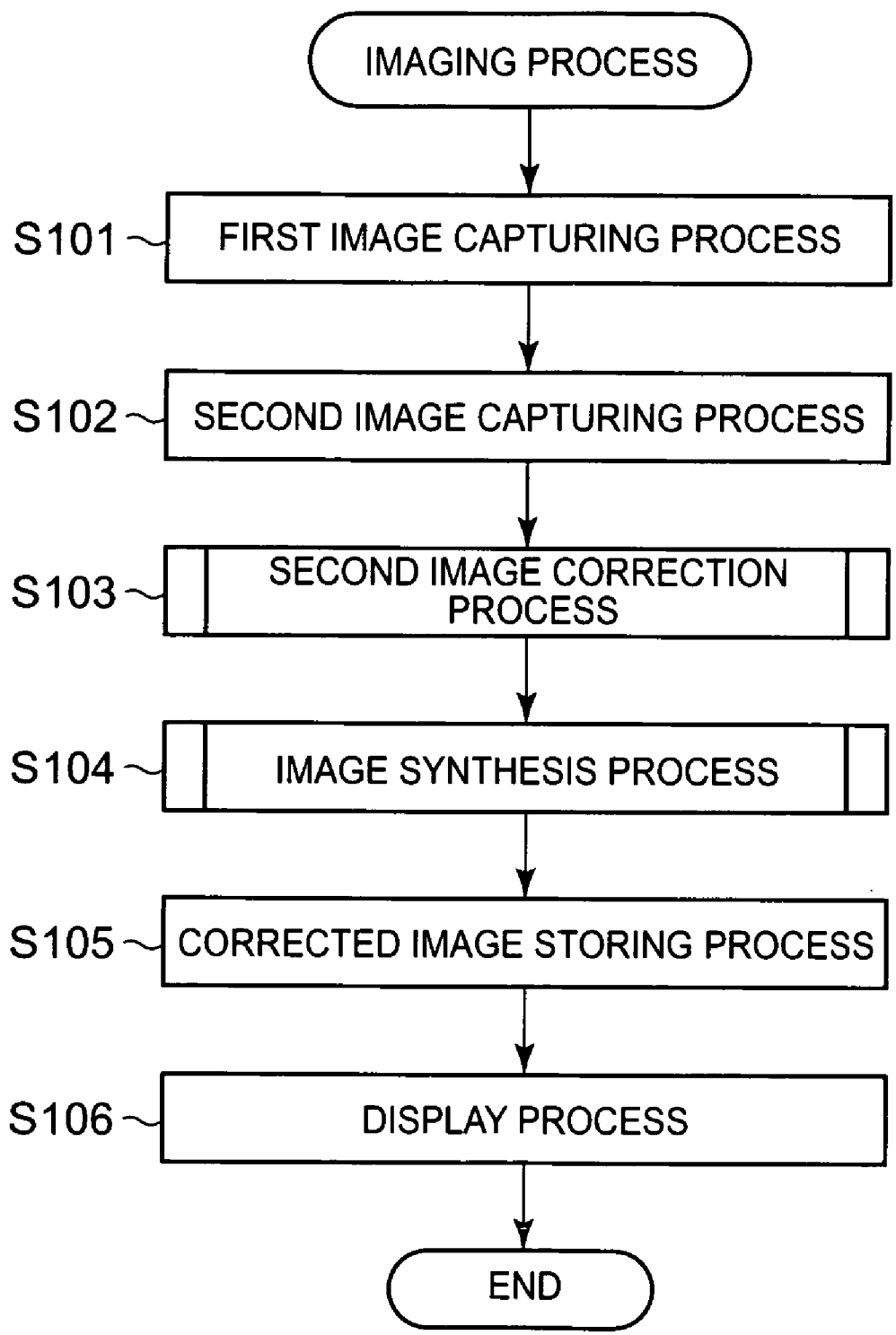

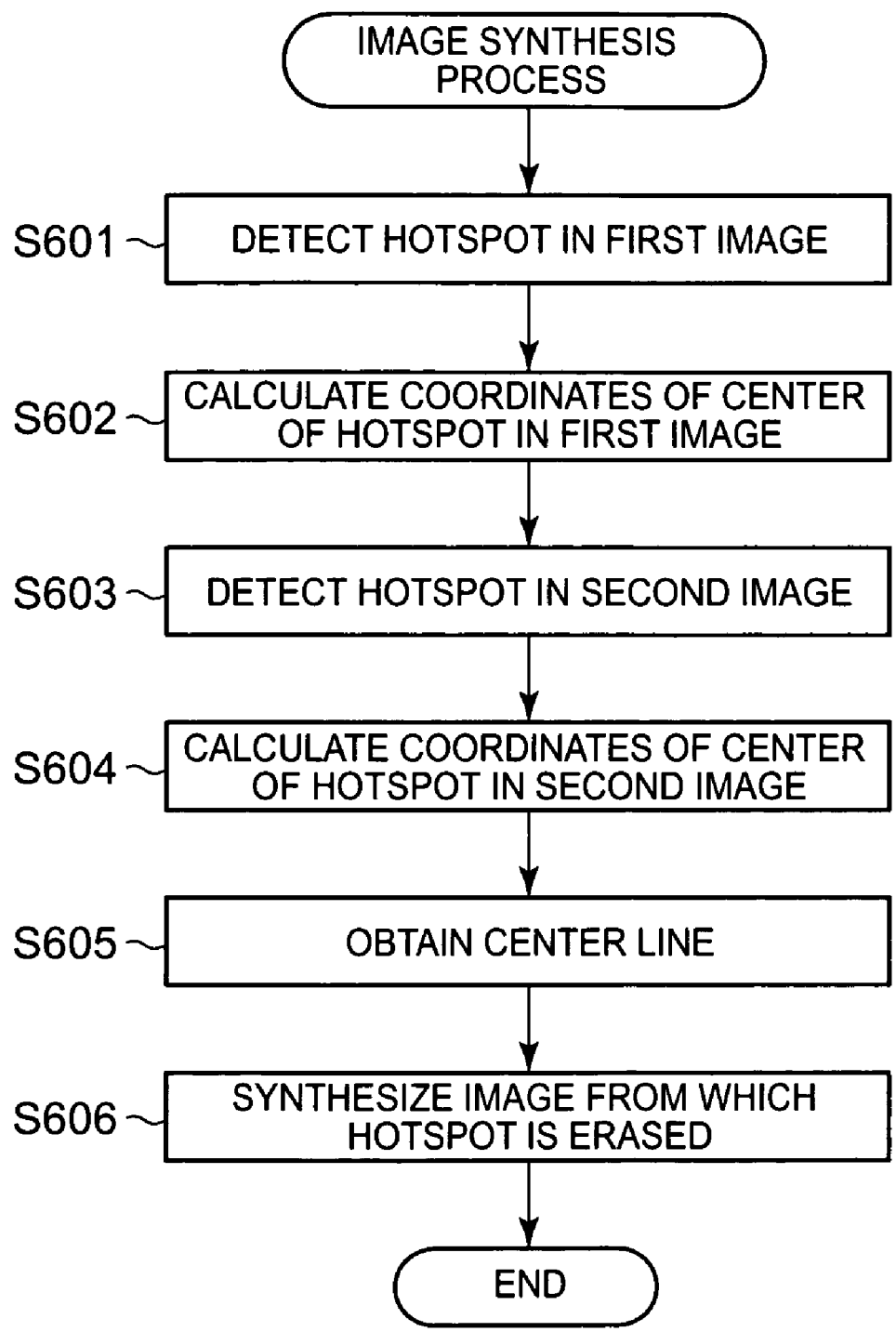

IMAGE CAPTURE APPARATUS WHICH SYNTHESIZES A PLURALITY OF IMAGES OBTAINED BY SHOOTING A SUBJECT FROM DIFFERENT DIRECTIONS, TO PRODUCE AN IMAGE IN WHICH THE INFLUENCE OF GLARE FROM A LIGHT IS REDUCED

BACKGROUND OF THE INVENTION

1. Field of the Invention

The present invention relates to an image capture apparatus, an image processing method for a captured image, and a recording medium.

2. Description of the Related Art

Digital images are stored and managed by personal computers, etc. as digital data. Hence, it is characteristic of digital images that they require little space for storage as compared with conventional filmed pictures usually stored in albums, and their image quality is less vulnerable to deterioration.

From these advantages of digital images, some methods have been put into practical use, which are for digitalizing pictures captured by a film camera by using a scanner, etc., and storing and managing the pictures like images captured by a digital camera (for example, Unexamined Japanese Patent Application KOKAI Publication No. H7-276710 (page 4, FIG. 1)). However, data reading by a scanner has the following problem.

The pictures have been adhered to the pages of the album, and sometimes need to be unstuck from the pages before being read by the scanner. The pictures might be torn when they are peeled from the pages. Therefore, there occurs an idea of reading the pictures by a digital camera instead of a scanner.

SUMMARY OF THE INVENTION

However, when a picture is captured by a digital camera, the subject picture is not put very close to the digital camera. Therefore, particularly, such a glossy material as a picture might be influenced by glare from a light, etc.

The present invention was made in view of such a conventional problem, and an object of the present invention is to provide an image capture apparatus, an image processing method for a captured image, and a recording medium capable of reducing the influence of the glare from a light.

To achieve the above object, an image capture apparatus according to a first aspect of the present invention is an apparatus for capturing an image of a subject, comprising:

a correction unit (25) which corrects distortions of a plurality of captured images obtained by shooting the subject from different directions, to obtain distortion-corrected images; and an image synthesis unit (25) which performs a predetermined calculation for each pixel in the plurality of distortion-corrected images obtained by the correction unit (25) in order to reduce a change in a pixel value which is caused by the glare from the light, and synthesizes an corrected image from the plurality of distortion-corrected images.

To achieve the above object, an image processing method for a captured image according to another aspect of the present invention is a method for processing a captured image obtained by shooting a subject, comprising:

a step of shooting the subject from different directions, and correcting distortions of a plurality of images obtained by the shooting to obtain a plurality of distortion-corrected images; and a step of detecting an area, in each captured image, which performing a predetermined calculation for reducing a change in a pixel value caused by the glare from the light, and synthesizing an corrected image from the plurality of distortion-corrected images.

To achieve the above object, a recording medium according to another aspect of the present invention stores a program for controlling a computer to function as:

a correction unit which shoots a subject from different directions, and corrects distortions of a plurality of images obtained by the shooting to obtain a plurality of distortion-corrected images; and an image synthesis unit which performs a predetermined calculation for reducing a change in a pixel value caused by the glare from the light, and synthesizes an corrected image from the plurality of distortion-corrected images.

According to the present invention, it is possible to reduce influence of the glare from a light.

BRIEF DESCRIPTION OF THE DRAWINGS

These objects and other objects and advantages of the present invention will become more apparent upon reading of the following detailed description and the accompanying drawings in which:

FIGS. 7A to 7D show equations used for a process performed by the image processing device;

FIGS. 8A to 8C show equations used for a process performed by the image processing device;

FIGS. 12A to 12D show equations used for the image synthesis process;

FIG. 16 is a flowchart showing an imaging process;

FIG. 25 is a flowchart showing an image synthesis process;

DETAILED DESCRIPTION OF THE PREFERRED EMBODIMENTS

First Embodiment

An image capture apparatus according to the first embodiment of the present invention will now be explained with reference to the drawings. In the present embodiment, the image capture apparatus will be explained as a digital camera.

Figure 1:
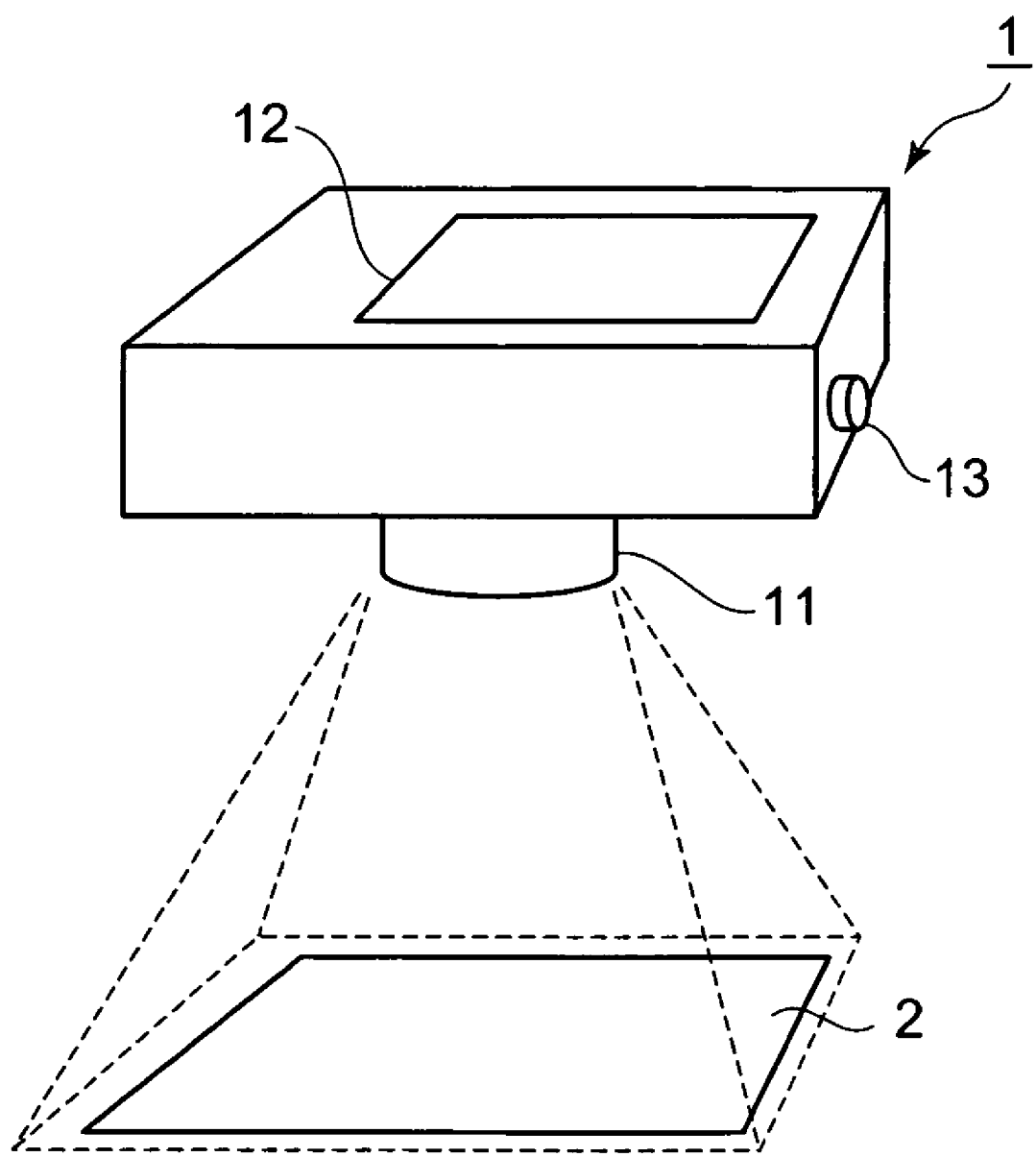
FIG. 1 is a diagram showing the appearance of a digital camera according to a first embodiment of the present invention.

FIG. 1 shows the structure of a digital camera 1 according to the present embodiment.

The digital camera 1 according to the present embodiment captures images of a silver-halide film picture 2 (hereinafter referred to as "film picture") printed on a glossy paper, etc., or images of a document from a plurality of different directions. The digital camera 1 then detects and corrects the distortions of the plurality of captured images to generate images which seem as if they were captured from right in front of them. In addition, the digital camera 1 applies image synthesis in order to reduce any glare from a light from the captured images. The digital camera 1 comprises a capture lens unit 11, a liquid crystal monitor 12, and a shutter button 13.

The capture lens unit 11 comprises a lens for converging light, etc., therefore converges light from a photographic subject such as a film picture 2, etc.

The liquid crystal monitor 12 displays the image taken in through the capture lens unit 11.

The shutter button 13 is a button pressed by the user when shooting the subject.

Figure 2:
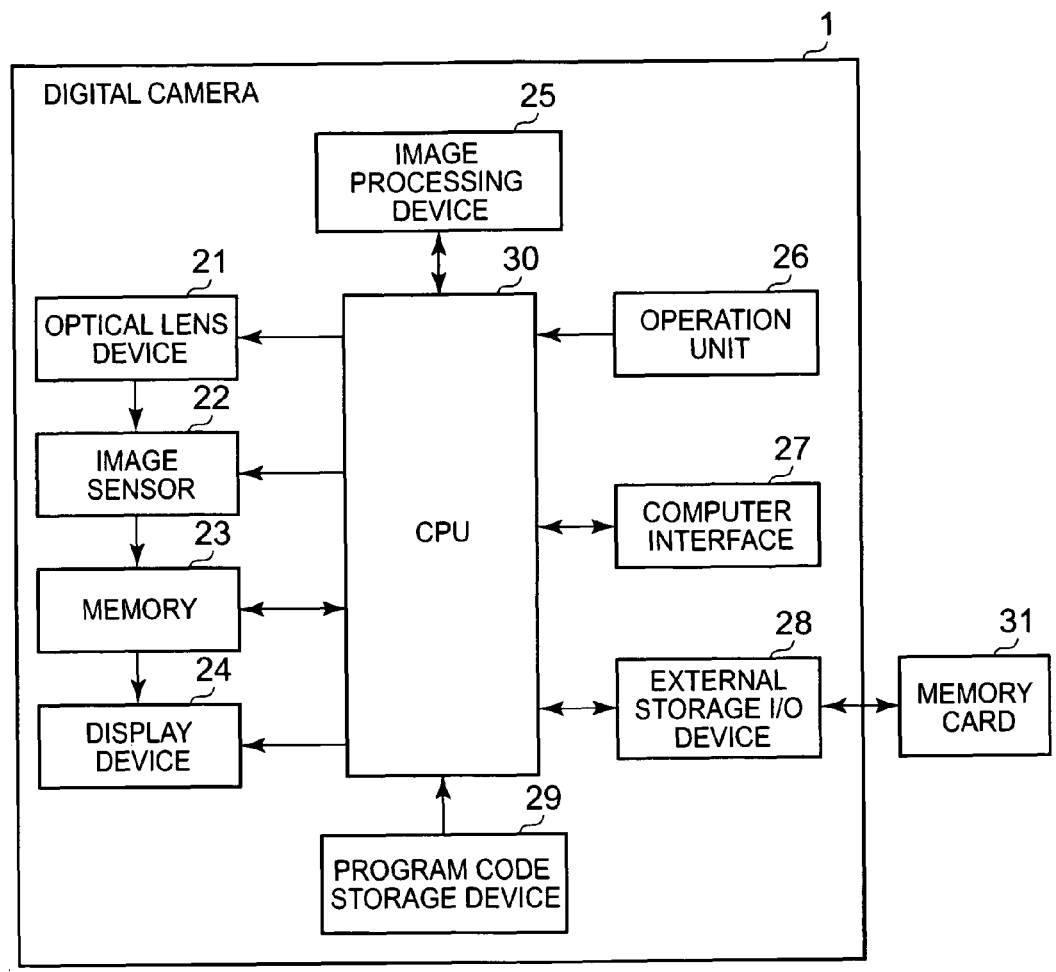
FIG. 2 is a block diagram showing the structure of the digital camera according to the first embodiment of the present invention.

As shown in FIG. 2, the digital camera 1 comprises an optical lens device 21, an image sensor 22, a memory 23, a display device 24, an image processing device 25, an operation unit 26, a computer interface 27, an external storage I/O device 28, a program code storage device 29, and a CPU 30.

The optical lens device 21 includes the capture lens unit 11 and a drive unit therefore. The optical lens device 21 converges light from a subject such as a film picture 2 to focus an image of the subject on the image sensor 22.

The image sensor 22 acquires the focused image as digitalized image data. The image sensor 22 is constituted by, for example, a CCD (Charged Coupled Device) or the like.

The image sensor 22 generates Bayer format image data having a low resolution or a high resolution under the control of the CPU 30. When the image capture mode is set to a low resolution mode by the CPU 30, the image sensor 22 generates digital image data having a low resolution for previewing purposes, and supplies the generated data to the memory 23 at regular intervals at a rate of about 30 frames per second.

When the image capture mode is set to a high resolution mode by the CPU 30, the image sensor 22 generates Bayer format image data having a high resolution, and supplies the generated image data to the memory 23.

Figure 3:
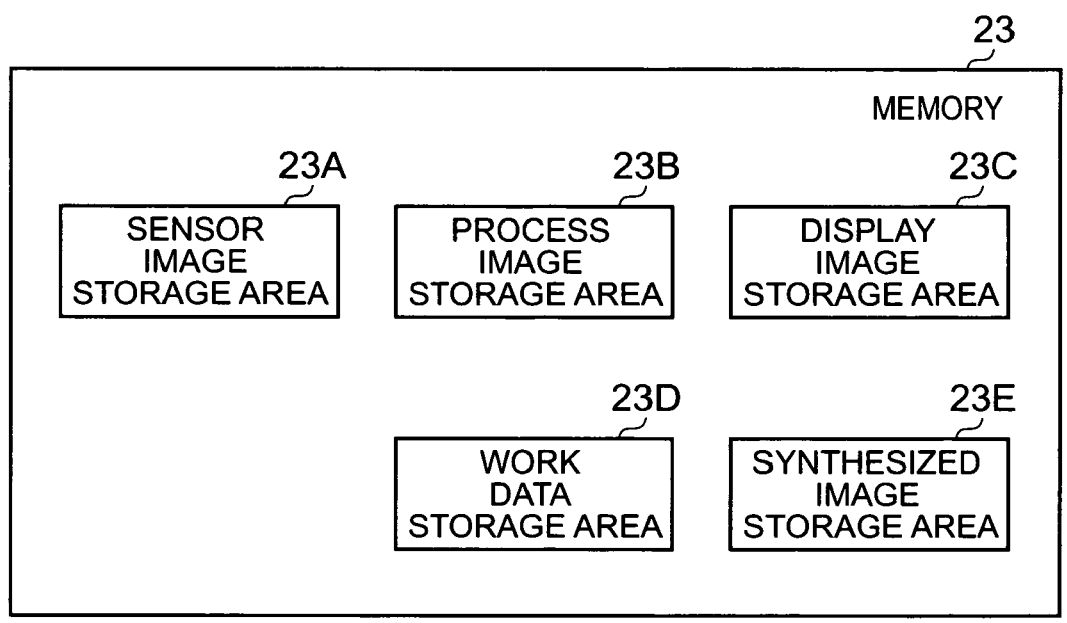
FIG. 3 is a block diagram showing each storage area of a memory.

The memory 23 stores the captured image data, etc. As shown in FIG. 3, the memory 23 includes a sensor image storage area 23A, a process image storage area 23B, a display image storage area 23C, a work data storage area 23D, and a synthesized image storage area 23E.

The sensor image storage area 23A is an area for keeping image data supplied from the image sensor 22 for a limited period of time, each time an image is captured. The process image storage area 23B is an area in which the image processing device 25 stores image data necessary for its processing. The display image storage area 23C is an area for storing image data for display to which image processing has been applied. The work data storage area 23D is an area for storing data necessary for works, such as coordinate data, etc. The synthesized image storage area 23E is an area for storing image data to which an image process to be described later has been applied by the image processing device 25.

The display device 24 comprises the liquid crystal monitor 12, to display images on the liquid crystal monitor 12. The display device 24 displays a preview image having a low resolution or an image having a high resolution, which is stored for a limited period of time in the display image storage area 23C of the memory 23, on the liquid crystal monitor 12.

The image processing device 25 applies image processes such as compression, distortion correction, image synthesis, etc. to the image data stored for a limited period of time in the process image storage area 23B of the memory 23.

The image processing device 25 mainly performs the following processes, as image processes.

(1) Image synthesis of sequentially captured images
(2) Image conversion
(3) Image data compression
(4) Image storage These processes will now be explained.

(1) Image Synthesis of Sequentially Captured Images

In order to reduce influence such as glare from a light when an image of a film picture is captured for digitalized storage, the image processing device 25 synthesizes a plurality of images of the film picture that are captured from different directions. At this time, the image processing device 25 subjects the plurality of captured images to keystone correction as one method for distortion correction, to correct distortions of the captured images.

Figure 4A:
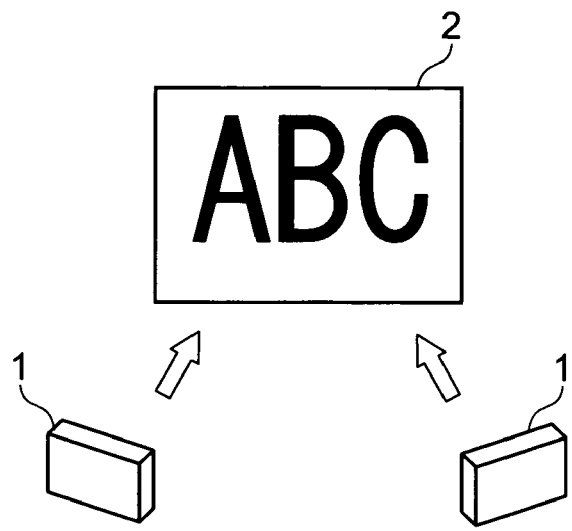
FIGS. 4A to 4D are diagrams exemplarily showing keystone correction performed by an image processing device.
Figure 4B:
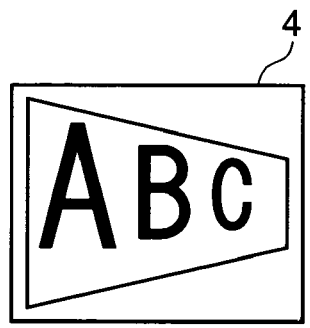
Figure 4C:
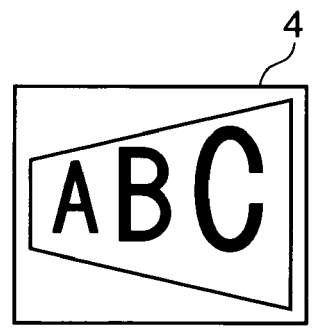
Figure 4D:
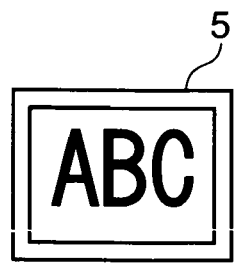

When the digital camera 1 captures the subject such as a film picture 2 from left and right directions as shown in FIG. 4A, distorted captured images 4 of the subject are displayed on the liquid crystal monitor 12, as shown in FIG. 4B and FIG. 4C. The image processing device 25 applies image processes to such captured images 4 as shown in FIG. 4B and FIG. 4C to generate a corrected image 5 shown in FIG. 4D which seems as if it were captured from in front of it.

When a picture is captured from two different directions, the captured two images will have different parts illuminated with glare from a light. By utilizing this phenomenon that the parts illuminated by the glare from the light are different between the two images, the image processing device 25 reduces the glare from the light.

Figure 5A:
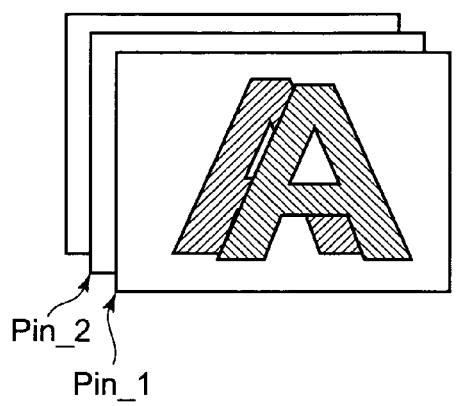
FIGS. 5A and 5B are diagrams exemplarily showing image synthesis performed by the image processing device.
Figure 5B:
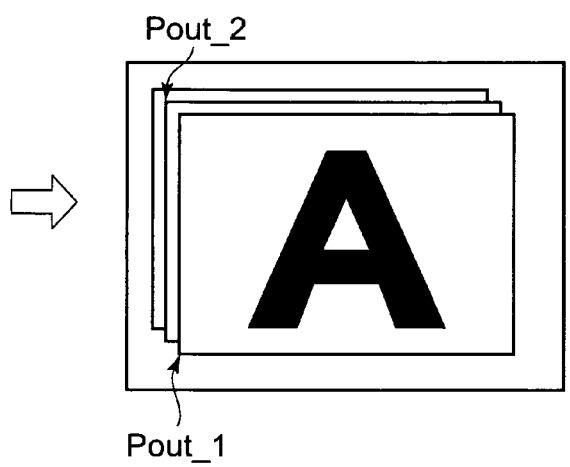

The digital camera 1 sequentially shoots a character "A" to obtain a plurality of images Pin_1, Pin_2, . . . , as shown in FIG. 5A. When the digital camera 1 combines the plurality of images Pin_1, Pin_2, . . . to generate output images Pout_1, Pout_2, . . . as shown in FIG. 5B, it is often the case that the characters on the respective images are not overlaid upon the others neatly due to camera shake, etc.

Hence, the image processing device 25 detects a motion between the images and estimates a motion vector between the images to combine and synthesize the images.

Figure 6:
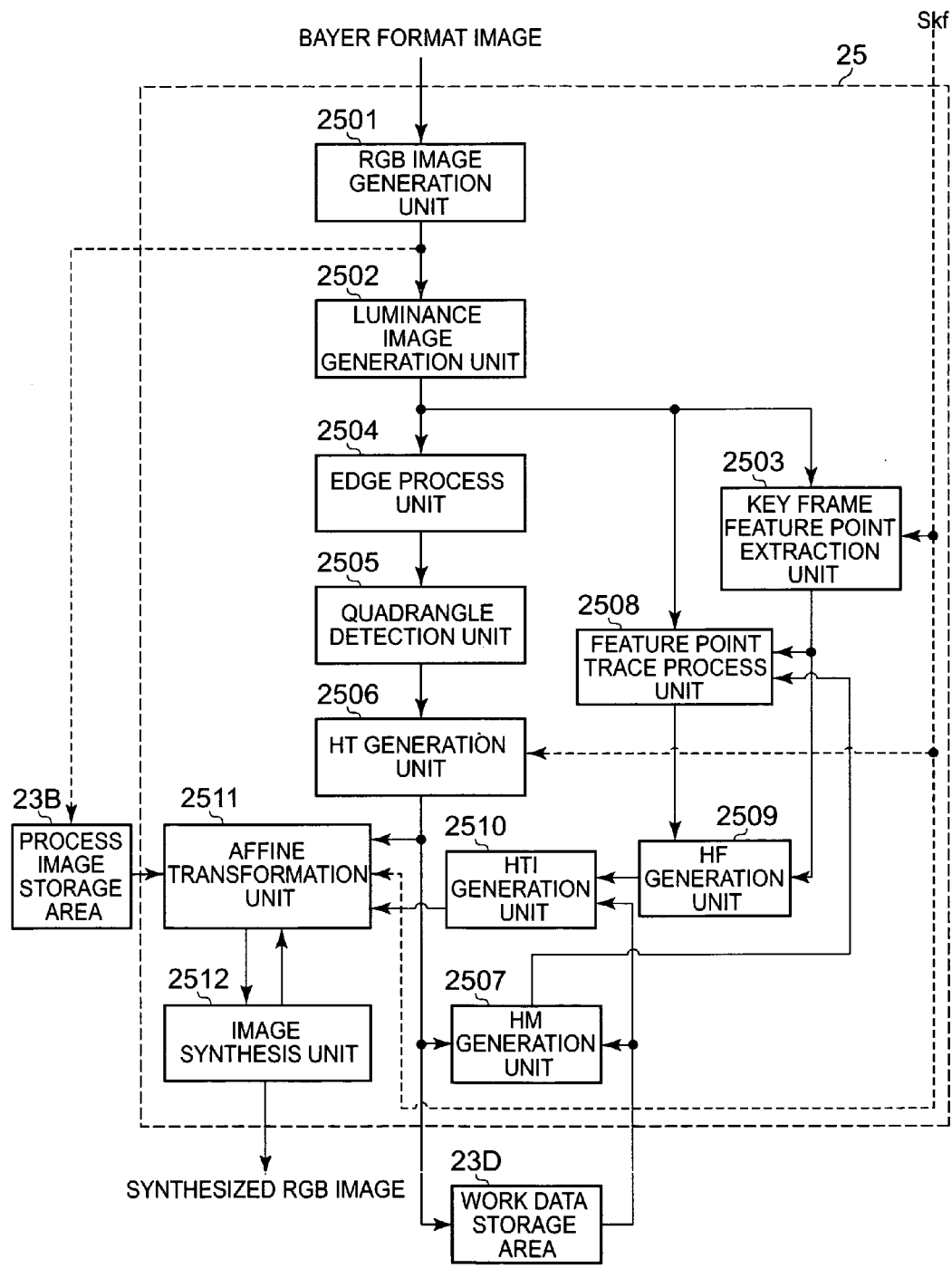
FIG. 6 is a diagram showing the structure of the image processing device.

To perform such an image process, the image processing device 25 comprises an RGB image generation unit 2501, a luminance image generation unit 2502, a key frame feature point extraction unit 2503, an edge process unit 2504, a quadrangle detection unit 2505, an HT generation unit 2506, an HM generation unit 2507, a feature point trace process unit 2508, an HF generation unit 2509, an HTI generation unit 2510, an affine transformation unit 2511, and an image synthesis unit 2512, as shown in FIG. 6.

The RGB image generation unit 2501 reads image data having a Bayer format from the sensor image storage area 23A of the memory 23, and converts the read Bayer format image into an RGB image. The RGB image generation unit 2501 stores the RGB image obtained by the conversion in the process image storage area 23B of the memory 23, as an image for image synthesis.

The luminance image generation unit 2502 converts the luminance of the RGB image generated by the RGB image generation unit 2501 to generate a luminance image represented by a luminance signal. A luminance signal is expressed in a two-dimensional order indicating the shade of each pixel.

The key frame feature point extraction unit 2503 extracts feature points among pixels from a luminance image generated by the luminance image generation unit 2502, when the luminance image input thereto is a key frame image. A feature point is a point representing a feature of an image, such as an edge of the image. A key frame is image data of the first captured image among images that are obtained in sequential shot, or represents a timing at which this image data is subjected to an image process.

The key frame feature point extraction unit 2503 extracts typically 50 or more feature points among the pixels from the luminance image of a key frame generated by the luminance image generation unit 2502, by using, for example, a KLT (Kanade-Lucas-Tomasi) method, etc.

The key frame feature point extraction unit 2503 generates a first feature point list. The first feature point list keeps records of a plurality of extracted feature points. The key frame feature point extraction unit 2503 stores the first feature point list in the work data storage area 23D of the memory 23.

The edge process unit 2504, the quadrangle detection unit 2505, and the HT generation unit 2506 operate in cooperation as will be described later, to obtain a keystone correction parameter HT for correcting a distortion of an image. The edge process unit 2504 applies an edge process to a luminance image luminance-converted by the luminance image generation unit 2502 to generate a binary edge image.

The quadrangle detection unit 2505 acquires quadrangle information from the binary edge image generated by the edge process unit 2504.

The HT generation unit 2506 generates an affine parameter HT for keystone correction based on the quadrangle information acquired by the quadrangle detection unit 2505. An affine parameter HT is represented by an equation shown in FIG. 7A in accordance with a representation method for homogeneous coordinates. In this equation, the coordinates (X0, Y0), (X1, Y1), (X2, Y2), and (X3, Y3) represent the vertexes of the quadrangle included in the quadrangle information. The symbols Usc and Vsc denote scale ratios, and are determined such that the aspect ratio of an input image and the output image size (UMAX, VMAX) thereof correspond to each other. The symbols α and β denote projection coefficients, which are expressed by the equations shown in FIG. 7B.

The aspect ratio of an input image is calculated by firstly using an equation shown in FIG. 7C. In this equation, the parameter "F" is a camera parameter representing a focal length, and is a given scalar quantity. The output image size (UMAX, VMAX) is a parameter which can be arbitrarily determined beforehand. According to the present embodiment, the output image size is equal to the input image size. Accordingly, the scale ratios Usc and Vsc are calculated by using the equations shown in FIG. 7D.

The HT generation unit 2506 is supplied with the coordinates of the vertexes of the quadrangle information, and then generates the affine parameter HT by using the equations shown in FIG. 7A to FIG. 7D.

Next, coordinate transformation using the affine parameter HT will be explained. With the output coordinate system represented using (U, V) and the coordinate system of an input image represented using (X, Y), affine transformation is performed using an affine parameter HT represented by equations shown in FIG. 8A. The ultimate coordinates (X, Y) that should be achieved are represented by equations shown in FIG. 8B.

Since the respective values X and Y of the coordinates (X, Y) do not necessarily take integers, the pixel value P(U, V) of the coordinates (U, V) of a pixel in the output image is calculated by interpolation based on a bilinear method, using values of pixels surrounding the coordinates (X, Y) in the input image. According to the interpolation based on a bilinear method, the pixel value P(U, V) is represented by the following equation.

$$P(U,V)=(1-Xd)*(1-Yd)*p(Xi,Yi)+Xd*(1-Yd)*p(Xi+1,Yi)+(1-Xd)*Yd*p(Xi,Yi+1)+Xd*Yd*p(Xi+1,Yi+1) \quad (1)$$

where p(X, Y) represents the pixel value of the coordinates (X, Y) of the input image, Xd and Yd represent the decimal part of X and Y, and Xi and Yi represent the integral part of X and Y.

The HM generation unit 2507 generates a motion prediction parameter HM. A motion prediction parameter HM is a parameter for predicting a motion of a current image from the key frame. The HM generation unit 2507 generates the motion prediction parameter HM from an inverse matrix $HTK^{-1}$ of an affine parameter HTK of a first frame and an affine parameter HT of a next frame, in accordance with the equation below.

$$HM=HTK^{-1}*HT \quad (2)$$

The feature point trace process unit 2508 traces the feature points based on the motion prediction parameter HM generated by the HM generation unit 2507 and the first feature point list stored in the work data storage area 23D of the memory 23.

To be more specific, the feature point trace process unit 2508 assigns the coordinates of each feature point in the first feature point list generated by the key frame feature point extraction unit 2503 into the equations shown in FIG. 8B, and then obtains the coordinates of that feature point in the next frame by using the coordinates (X, Y) obtained from the assignment and the motion prediction parameter HM represented by the equation (2).

The feature point trace process unit 2508 obtains the coordinates of the feature points of the two images, by using optical flow. The feature point trace process unit 2508 records the obtained coordinates of the feature points in a second feature point list.

The HF generation unit 2509 generates an affine parameter HF representing a correlation with the key frame. The HF generation unit 2509 generates the affine parameter HF, based on the first feature point list obtained by the key frame feature point extraction unit 2503 and the second feature point list obtained by the feature point trace process unit 2508, by using least square method.

Generally, the affine parameter HF results in a value approximate to the motion prediction parameter HF generated by the HM generation unit 2507, while it is a more precise parameter.

The HTI generation unit 2510 generates an affine parameter HTI, based on the affine parameter HF generated by the HF generation unit 2509, by using the equation (3) below.

$$HTI = HTK * HF \quad (3)$$

The affine transformation unit 2511 reads RGB pixel data before being subjected to keystone correction, that corresponds to coordinates (U, V) after keystone correction which is designated by the image synthesis unit 2512, from the process image storage area 23B.

Specifically, the affine transformation unit 2511 selects either one of the affine parameters HT and HTI, based on the value of a key frame signal Skf to be described later. That is, the affine transformation unit 2511 selects the affine parameter HT in a case where the key frame signal Skf takes a value 1, while selects the affine parameter HTI in a case where the key frame signal Skf takes a value 0.

The affine transformation unit 2511 obtains coordinates (X, Y) before being subjected to keystone correction, which corresponds to the coordinates (U, V), by using the equation shown in FIG. 8B and the selected affine parameter.

Further, the affine transformation unit 2511 obtains the pixel value P(X, Y) of the coordinates (X, Y), by using the above-described interpolation based on a bilinear method.

The image synthesis unit 2512 synthesizes the images transformed by the affine transformation unit 2511. The image synthesis unit 2512 synthesizes the images so that the pixels in the plurality of distortion-corrected images correspond, by using an equation shown in FIG. 8C. In this equation, Ct represents a count value indicating the number of times image synthesis has been performed. The image synthesis unit 2512 increments the count value Ct in accordance with an equation (4) below, each time it performs image synthesis.

$$Ct = Ct + 1 \quad (4)$$

Then, the image synthesis unit 2512 stores the count value Ct in the work data storage area 23D of the memory 23.

The equation shown in FIG. 8C represents the addition average of the pixel values of the distortion-corrected images. In a case where one image has an area thereof illuminated with glare from a light, a pixel value in this area approximates to a pixel value obtained when there is no glare from a light, because it is addition-averaged with pixel values of other images having no glare in the corresponding area.

Accordingly, as the number of images to be synthesized increases, the pixel value of the area illuminated with the glare from the light approximates more to the pixel value of the area illuminated with no glare. That is, the image synthesis unit 2512 reduces the change of the pixel value that is caused by the glare from the light, by performing addition-averaging using the equation shown in FIG. 8C.

(2) Image Conversion

Image conversion is a process for converting a low resolution Bayer image into a low resolution RGB image, converting a high resolution RGB image into a low resolution image, and converting a Bayer image into YUV image.

In a case where the image capture mode is set by the CPU 30 to the low resolution mode, the image processing device 25 reads low resolution Bayer format image data from the sensor image storage area 23A of the memory 23, and converts the read low resolution Bayer format image data into low resolution RGB image data. This low resolution RGB image is an image for preview display. The image processing device 25 stores the low resolution RGB image data obtained by the conversion in the display image storage area 23C of the memory 23.

After executing the image synthesis process, the image processing device 25 converts image data in a high resolution RGB format into low resolution RGB image data for preview display. The image processing device 25 stores the low resolution RGB image obtained by the conversion in the display image storage area 23C of the memory 23.

In a case where a "store" key of the operation unit 26 is pressed after the image synthesis process is executed, the image processing device 25 reads synthesized image data from the synthesized image storage area 23E of the memory 23 and converts it into YUV image data.

(3) Image Data Compression

Image data compression is a process for compressing image data into a predetermined data format, when the image data is to be stored in a memory card 31. JPEG (Joint Photographic Experts Group) format is typically employed. The image processing device 25 executes this process after it converts synthesized image data into YUV image data in the image conversion process.

(4) Image Storage

Image storage is a process for storing an image in the memory card 31. The image processing device 25 image data of a YUV image which has been compressed into, for example, JPEG format, in the memory card 31 via the external storage I/O device 28. The image processing device 25 is designed to store image data in the memory card 31. The memory card 31 includes a header information storage area for storing header information regarding image data. The image processing device 25 records header information regarding image data in the header information storage area, when it stores image data in the memory card 31.

The operation unit 26 comprises the shutter button 13, a power key, a store key, etc. for controlling the functions of the digital camera 1.

The power key is a key to be pressed when the power of the digital camera 1 is switched on. The store key is a key to be pressed for storing data of images obtained by image capturing. When these keys or switch is pressed by the user, the operation unit 26 sends operational information corresponding to the keys or switch to the CPU 30.

The computer interface 27 operates as a storage class driver for, for example, an USB (Universal Serial Bus), when the digital camera 1 is connected to a computer (unillustrated). This allows the computer, when it is connected to the digital camera 1, to use the memory card 31 as an external storage device.

The external storage I/O device 28 is an interface which inputs or outputs image data, etc. from or to the memory card 31. The memory card 31 stores image data, etc. supplied from the external storage I/O device 28.

The program code storage device 29 stores programs to be executed by the CPU 30. The program code storage device 29 is constituted by, for example, a ROM (Read Only Memory) or the like.

The CPU 30 controls the digital camera 1 on the whole, in accordance with the programs stored in the program code storage device 29.

When the switch or key of the operation unit 26 is pressed and operational information is sent form the operation unit 26, the CPU 30 controls the image sensor 22, the memory 23, the display device 24, the mage processing device 25, etc.

The CPU 30 determines whether or not the power key is pressed, based on operational information from the operation unit 26. When operational information notifying that the power key is pressed is sent from the operation unit 26, the CPU 30 executes a camera control process to be described later.

The power of the digital camera 1 is turned on, the CPU 30 performs initialization of the digital camera 1, initialization of the memory 23, initialization of the synthesis process, etc. In the initialization of the digital camera 1, conditions for image capture and the image capture mode are initialized. The conditions for image capture include, for example, the focus of the digital camera 1, the shutter speed (exposure time), aperture value or the like, white balance, sensitivity, etc.

In the initialization of the synthesis process, the CPU 30 sets the key frame signal Skf to 1. The key frame signal Skf is a signal for determining whether or not a captured image is the key frame, which is the first frame. The key frame signal Skf is set to 1 or 0. Skf=1 represents that the captured image is the key frame. When the image processing device 25 performs the image synthesis process, the CPU 30 clears the key frame signal Skf to set it to 0. Skf=0 represents that the captured image is any of the images that are captured after the first image. The CPU 30 stores the value of the key frame signal Skf in the work data storage area 23D.

Further, in the initialization of the synthesis process, the CPU 30 initializes the count value Ct stored in the work data storage area 23D, and all the pixel values Q(U,V) stored in the synthesized image storage area 23E to 0.

The CPU 30 determines whether the shutter button 13 is pressed or not, based on operational information from the operation unit 26. In a case where the shutter button 13 is not pressed, the CPU 30 sets the image capture mode to the low resolution mode. In a case where the shutter button 13 is pressed, the CPU 30 sets the image capture mode to the high resolution mode.

The CPU 30 determines whether or not the store key is pressed, based on operational information from the operation unit 26. In a case where it is determined that the store key is pressed, the CPU 30 controls the image processing device 25 to perform image conversion of a synthesized RGB image into a YUV image. Further, the CPU 30 controls the image processing device 25 to perform compression of the image data and to perform the image storage process.

Note that the CPU 30 determines whether the store key is pressed within a set period of time or not. In a case where it is determined that the store key is not pressed within the set period of time, the CPU 30 determines whether the power key is pressed or not, based on operational information from the operation unit 26. In a case where it is determined that the power key is pressed, the CPU 30 switches off the power of the digital camera 1.

To the contrary, in a case where it is determined that the power key is not pressed, the CPU 30 again determines whether the shutter button 13 is pressed or not, and sets the image capture mode based on the determination result.

Next, the operation of the digital camera 1 according to the present embodiment will be explained.

When the user switches on the power of the digital camera 1, the CPU 30 acquires the program data stored in the program code storage device 29.

The operation unit 26 sends operation information regarding an operation made by the user to the CPU 30. The CPU 30 receives the operation information. The CPU 30, the image processing device 25, etc. perform a camera control process in accordance with a flowchart shown in FIG. 9 and FIG. 10.

First, the CPU 30 performs initialization of the digital camera 1, and initialization of the memory 23 (step S11).

The CPU 30 performs initialization of the synthesis process (step S12). The CPU 30 sets the key frame signal Skf to 1, and stores Skf=1 in the work data storage area 23D of the memory 23. The CPU 30 initializes the count value Ct stored in the work data storage area 23D to 0, and initializes the pixel values Q(U, V) stored in the synthesized image storage area 23E.

The CPU 30 determines whether the shutter button 13 is pressed or not, based on operational information from the operation unit 26 (step S13).

In a case where it is determined that the shutter button 13 is not pressed (step S13; No), the CPU 30 sets the image capture mode to the low resolution mode (step S14).

When the CPU 30 sets the image capture mode to the low resolution mode, it controls the capture lens unit 11 and the optical lens device 21 to perform image capture at a low resolution (step S15). The image sensor 22 generates Bayer format image data having a low resolution, and sends the generated low resolution Bayer format image data to the memory 23. The memory 23 stores the low resolution image data in the sensor image storage area 23A.

The image processing device 25 reads the low resolution Bayer format image data from the sensor image storage area 23A of the memory 23 (step S116).

The image processing device 25 converts the format of the read low resolution Bayer format image data, to generate a low resolution RGB image for preview (step S17).

The image processing device 25 stores the data of the generated low resolution RGB image in the display image storage area 23C of the memory 23. The display device 24 reads the data of the low resolution RGB image from the display image storage area 23C, and displays the low resolution RGB image on the liquid crystal monitor 12 (step S18).

The CPU 30 determines whether the power key is pressed or not, based on operational information from the operation unit 26 (step S19).

In a case where it is determined that the power key is not pressed (step S19; No), the CPU 30 again determines whether the shutter button 13 is pressed or not (step S14).

When it is determined that the shutter button 13 is pressed (step S14; Yes), the CPU 30 sets the image capture mode to the high resolution mode (step S21).

When the CPU 30 sets the image capture mode to the high resolution mode, it controls the capture lens unit 11 and the optical lens device 21 to perform image capture at a high resolution (step S22).

The image sensor 22 generates data of a high resolution Bayer format image, and sends the data of the high resolution image to the memory 23 (step S22). The memory 23 stores the image data in the sensor image storage area 23A.

The image processing device 25 reads the image data of the high resolution Bayer format image from the sensor image storage area 23A of the memory 23 (step S23).

The image processing device 25 applies image synthesis to the read data of the high resolution Bayer format image (step S24).

Figure 11:
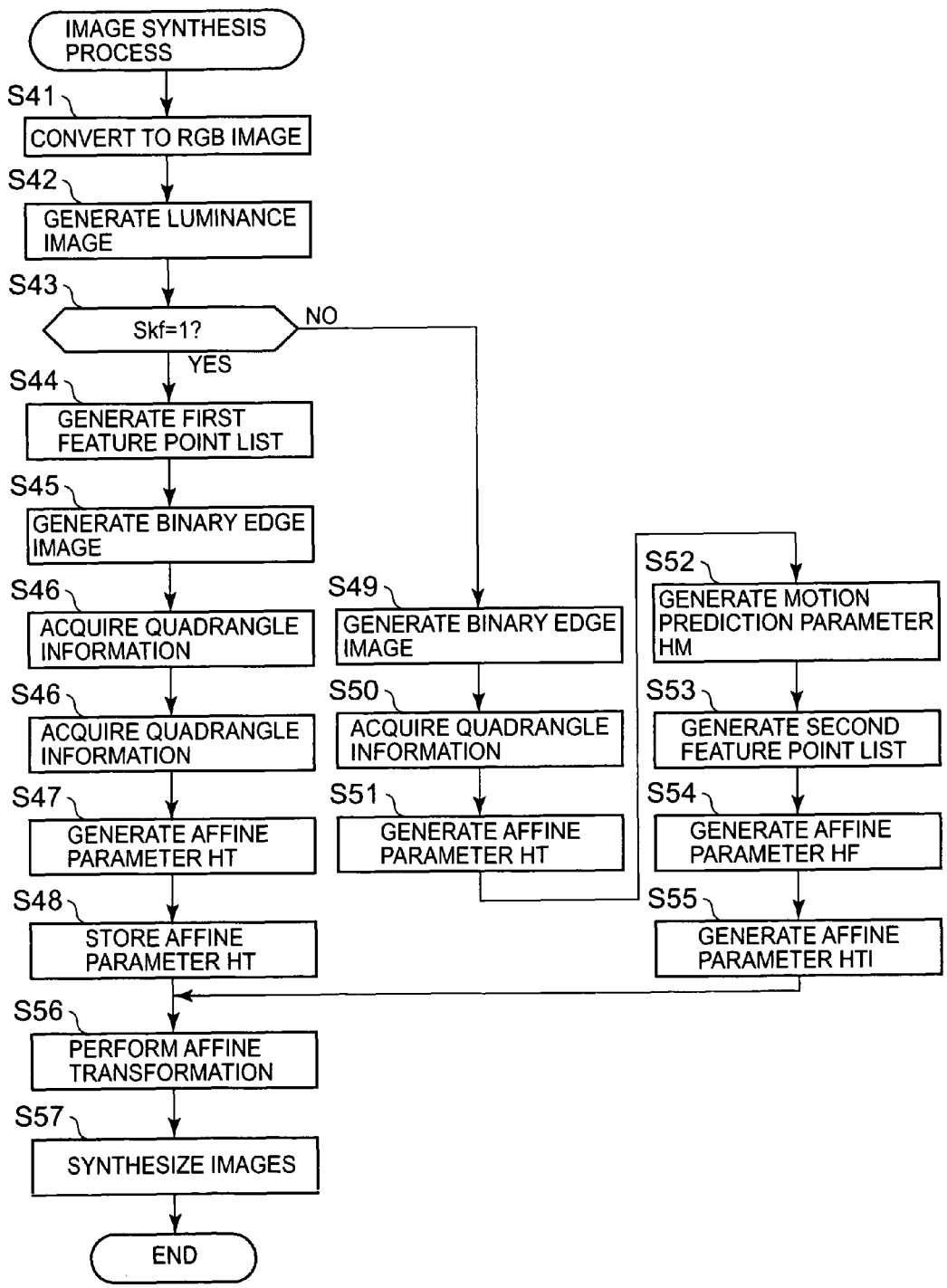
FIG. 11 is a flowchart showing an image synthesis process performed by the image processing device.

The image processing device 25 performs the image synthesis in accordance with a flowchart shown in FIG. 11.

The RGB image generation unit 2501 converts the Bayer format image into an RGB image. The RGB image generation unit 2501 stores the RGB obtained by the conversion in the process image storage area 23B of the memory 23 (step S41).

The luminance image generation unit 2502 performs luminance conversion of the RGB image obtained after the conversion by the RGB image generation unit 2501, to generate a luminance image (step S42).

The image processing device 25 refers to the key frame signal Skf stored in the work data storage area 23D of the memory 23, and determines whether the key frame signal Skf is set to 1 or not (step S43).

In a case where it is determined that the key frame signal Skf is set to 1 (step S43; Yes), the image processing device 25 determines that the image data having been read from the process image storage area 23B of the memory 23 is the image data representing the key frame.

In this case, the key frame feature point extraction unit 2503 extracts feature points from the luminance image of the key frame generated by the luminance image generation unit 2502, and generates a first feature point list (step S44). The key frame feature point extraction unit 2503 stores the generated first feature point list in the work data storage area 23D of the memory 23.

The edge process unit 2504 applies the edge process to the luminance image generated by the luminance image generation unit 2502 to generate a binary edge image (step S45).

The quadrangle detection unit 2505 acquires quadrangle information from the binary edge image generated by the edge process unit 2504 (step S46).

The HT generation unit 2506 generates an affine parameter HT based on the quadrangle information acquired by the quadrangle detection unit 2505, by using the equations shown in FIG. 7A to FIG. 7D (step S47).

The HT generation unit 2506 stores the generated affine parameter HT in the process image storage area 23B of the memory 23 (step S48).

The affine transformation unit 2511 performs affine transformation of the RGB image (step S56). Specifically, the affine transformation unit 2511 selects the affine parameter HT, which corresponds to Skf=1. Then, the affine transformation unit 2511 performs affine transformation by assigning the affine parameter HT, and sequentially the respective pixel coordinates (U, V) after being subjected to keystone correction, into the equations shown in FIG. 8B. The affine transformation unit 2511 obtains the coordinates (X, Y) of the pixels corresponding to the pixels in the distorted image before being subjected to keystone correction. Then, the affine transformation unit 2511 calculates the pixel value P(U, V) from the values of the pixels surrounding the coordinate (X, Y) in the input image, by using the interpolation based on a bilinear method mentioned above. The affine transformation unit 2511 performs this calculation for all the coordinates included in the range of the image to be output.

The image synthesis unit 2512 performs image synthesis (step S57). That is, the image synthesis unit 2512 generates the pixel value Q(U, V) of the synthesized image by using the equation shown in FIG. 8C. Since it is Ct=0 in the initialized state, the pixel value P(U, V) straightly becomes the pixel value Q(U, V) of the synthesized image.

The image synthesis unit 2512 stores the generated pixel value Q(U, V) of the synthesized image in the synthesized image storage area 23E of the memory 23. The image synthesis unit 2512 increments the count value Ct stored in the work data storage area 23D, in the manner represented by the equation (4).

Figure 10:
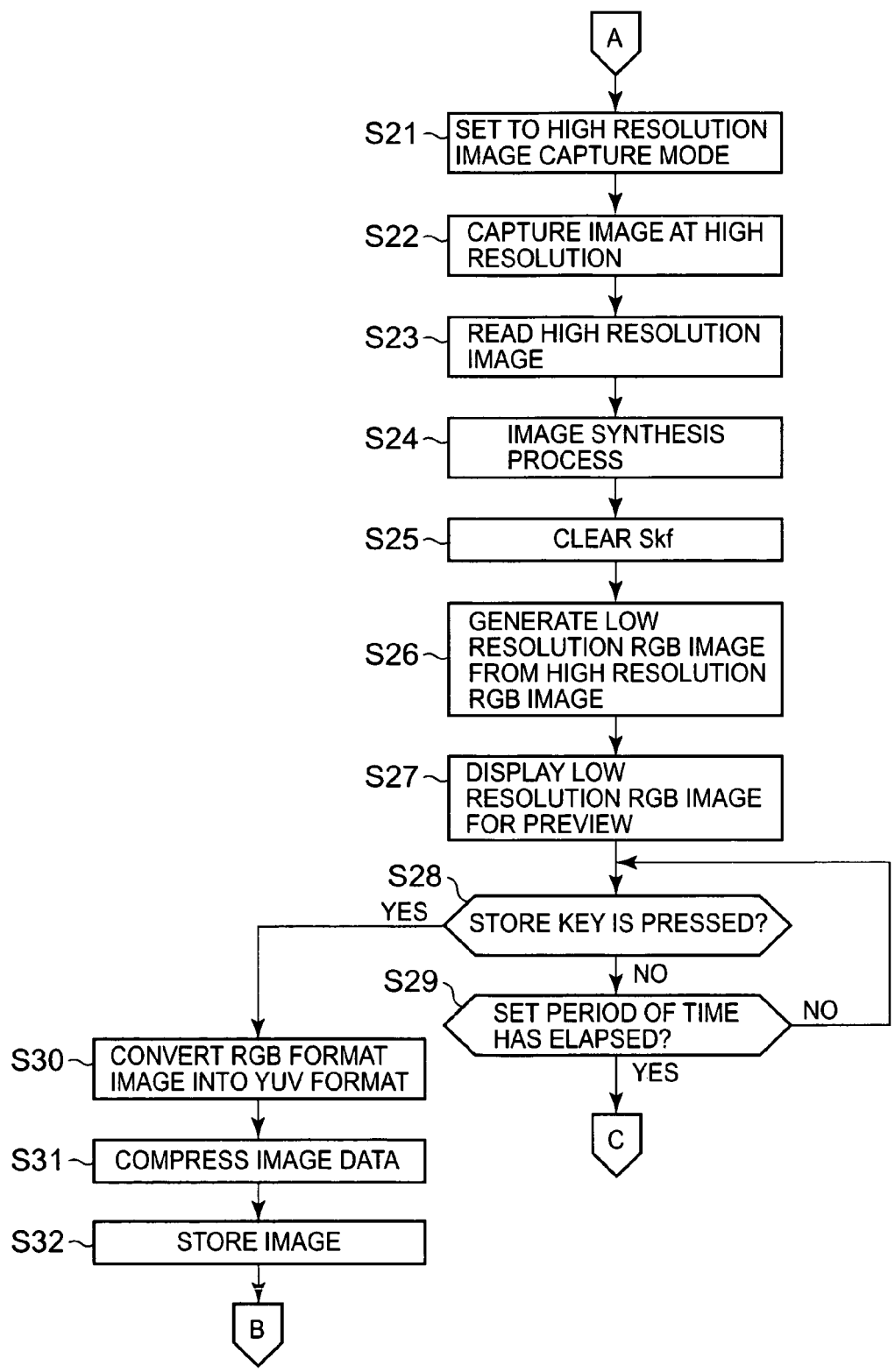
FIG. 10 is a flowchart showing the camera control process (continuation) performed by the digital camera.

When the image synthesis is performed by the image processing device 25, the CPU 30 clears the key frame signal Skf (step S25 of FIG. 10). The CPU 30 stores this key frame signal Skf in the work data storage area 23D of the memory 23.

The image processing device 25 converts the resolution of the high resolution RGB image generated in the image synthesis process, to generate a low resolution RGB image for preview display (step S26).

The image processing device 25 stores the data of the generated low resolution RGB image in the display image storage area 23C of the memory 23. The display device 24 reads the data of the low resolution RGB image from the display image storage area 23C of the memory 23, and displays the image on the liquid crystal monitor 12 for preview (step S27).

The CPU 30 determines whether the store key is pressed or not, based on operational information from the operation unit 26 (step S28).

When it is determined that the store key is not pressed (step S28; No), the CPU 30 determines whether a set period of time for preview display has elapsed or not (step S29).

In a case where it is determined that the set period of time has elapsed (step S29; Yes), the CPU 30 determines whether the power key is pressed or not, based on operational information from the operation unit 26 (step S19 of FIG. 9).

In a case where it is determined that the power key is not pressed (step S19; No), the CPU 30 again determines whether the shutter button 13 is pressed or not, based on operational information from the operation unit 26 (step S13).

In a case where it is determined that the shutter button 13 is pressed (step S13; Yes), the CPU 30 again sets the image capture mode to the high resolution mode to perform image capture at a high resolution (steps S21 and S22 of FIG. 10).

The image sensor 22 generates data of a high resolution Bayer format image, and stores the data of this high resolution image in the sensor image storage area 23A of the memory 23.

The image processing device 25 reads the data of the high resolution image from the sensor image storage area 23A of the memory 23, and performs the image synthesis process (steps S23 and S24).

The RGB image generation unit 2501 of the image processing device 25 converts the Bayer format image into an RGB image, and stores the RGB image obtained by the conversion in the process image storage area 23B of the memory 23. The luminance image generation unit 2502 generates a luminance image (steps S41 and S42 of FIG. 11).

The image processing device 25 refers to the key frame signal Skf stored in the work data storage area 23D of the memory 23 to determine whether the key frame signal Skf is set to 1 or not (step S43).

Since, this time, the key frame signal Skf is cleared, the image processing device 25 determines that the image data read from the process image storage area 23B of the memory 23 is not the image data of the key frame (step S43; No).

Further, likewise at steps S45 to S47, the edge process unit 2504 generates a binary edge image, and the quadrangle detection unit 2505 acquires quadrangle information from the binary edge image (steps S49 and S50).

Then, the HT generation unit 2506 generates an affine parameter HT, based on the quadrangle information acquired by the quadrangle detection unit 2505, by using the equations shown in FIG. 7A to FIG. 7D (step S51).

The HM generation unit 2507 calculates a motion prediction parameter HM from the inverse matrix $HTK^{-1}$ of the affine parameter of the first frame and the affine parameter HT of the next frame, by using the equation (2) (step S52).

The feature point trace process unit 2508 obtains the motion prediction parameter HM from the HM generation unit 2507, and obtains the first feature point list from the work data storage area 23D of the memory 23. Then, the feature point trace process unit 2508 obtains the correct coordinates of the feature points by using the equations shown in FIG. 8B and optical flow, based on the obtained motion prediction parameter HM and first feature point list, thereby to generate a second feature point list (steps S53).

The HF generation unit 2509 obtains the feature points from the first and second feature point lists generated by the key frame feature point extraction unit 2503 and feature point trace process unit 2508. Then, the HF generation unit 2509 generates an affine parameter HF representing the correlation with the key frame, in accordance with least square method (step S54).

The HTI generation unit 2510 generates an affine parameter HTI expressed by the equation (3), based on the affine parameter HF generated by the HF generation unit 2509 (step S55).

The affine transformation unit 2511 selects the affine parameter HTI, which corresponds to Skf=0. Then, the affine transformation unit 2511 performs the above-described process to calculate the pixel values of all the coordinates included in the range of the image to be output (step S56).

The image synthesis unit 2512 performs image synthesis (step S57). That is, the image synthesis unit 2512 calculates pixel values Q(U, V) of the synthesized image in accordance with the equation shown in FIG. 8C, using the pixel values P(U, V) calculated by the affine transformation unit 2511, and the pixel value Q(U, V) calculated in the last image capturing, read from the synthesized image storage area 23E of the memory 23.

The image synthesis unit 2512 stores the pixel values Q(U, V) of the generated synthesized image back again in the synthesized image storage area 23E of the memory 23. The image synthesis unit 2512 increments the count value Ct stored in the work data storage area 23D, in the manner represented by the equation (4).

When the image processing device 25 completes the image synthesis process as described above, the CPU 30 clears the key frame signal Skf again (step S25 of FIG. 10).

The image processing device 25 stores the data of the generated low resolution RGB image in the display image storage area 23C of the memory 23. The display device 24 reads the data of the low resolution RGB image from the display image storage area 23C of the memory 23, and displays the image on the liquid crystal monitor 12 for preview (step S27).

The CPU 30 determines whether the store key is pressed or not, based on operational information from the operation unit 26 (step S28).

In a case where it is determined that the store key is not pressed (step S28; No), the CPU 30 determines whether the set period of time for preview display has elapsed or not (step S29).

In a case where it is determined that the set period of time for preview display has not yet elapsed (step S29; No), the CPU 30 again determines whether the store key is pressed or not based on operational information from the operation unit 26 (step S28).

In a case where it is determined that the store key is pressed (step S28; Yes), the image processing device 25 reads the data of the synthesized RGB image from the synthesized image storage area 23E of the memory 23, and converts its format to generate data of a YUV image (step S30).

The image processing device 25 compresses the YUV image data into JPEG format (step S31).

The image processing device 25 stores the data of the YUV image compressed into JPEG format in the memory card 31 via the external storage I/O device 28 (step S32).

Figure 9:
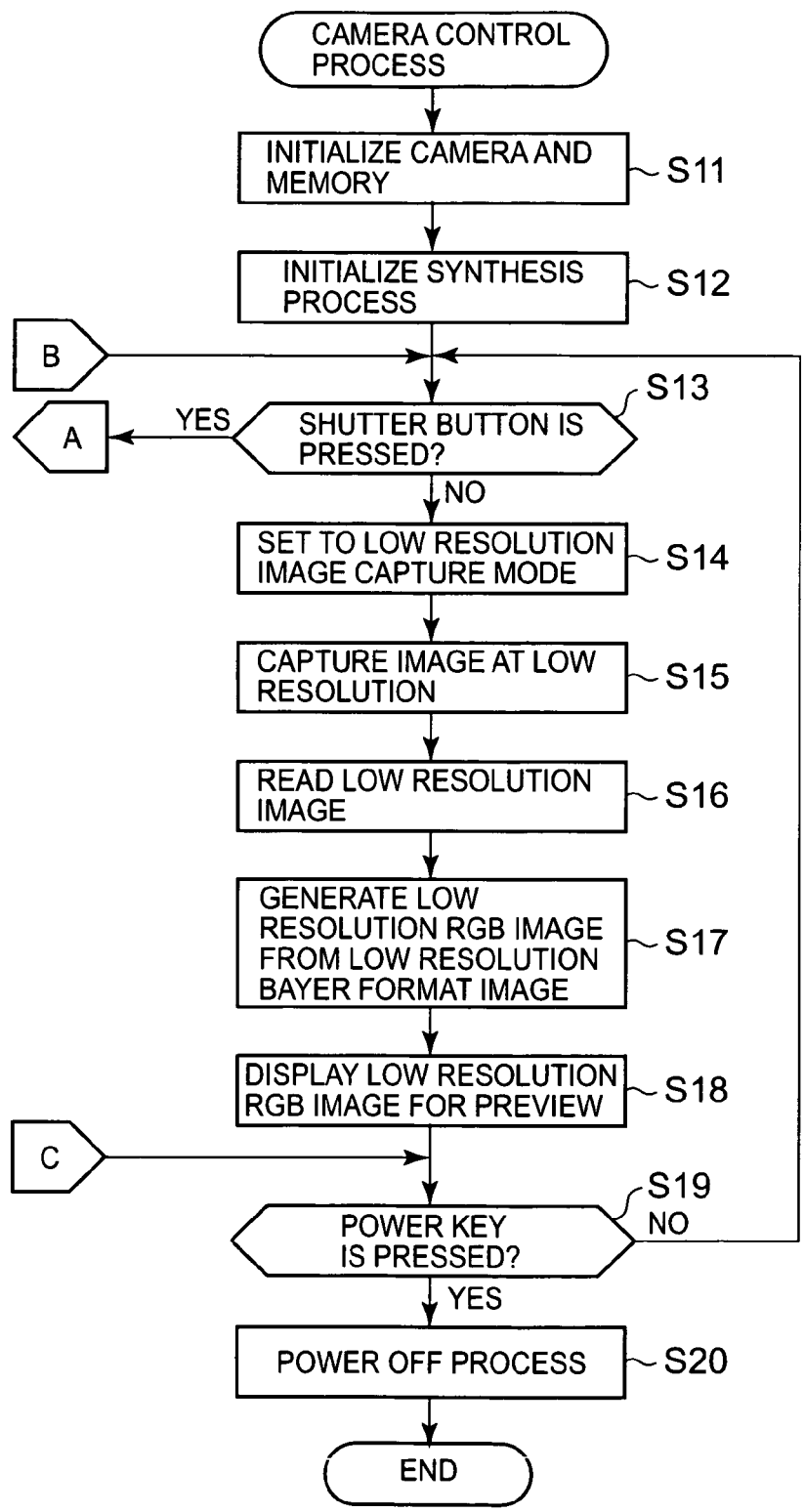
FIG. 9 is a flowchart showing a camera control process performed by the digital camera.

The CPU 30 determines again whether the shutter button 13 is pressed or not, based on operational information form the operation unit 26 (step S13 of FIG. 9).

In a case where it is determined that the shutter button 13 is not pressed (step S13; No), the CPU 30 sets the image capture mode to the low resolution mode (step S14).

Then, the CPU 30 determines whether the power key is pressed or not based on operation information from the operation unit 26 (step S19).

In a case where it is determined that the power key is pressed (step S19; Yes), the CPU 30 switches off the power of the digital camera 1 (step S20). Thus, the CPU 30 terminates the camera control process.

As explained above, according to the present embodiment, the image processing device 25 synthesizes a plurality of images and addition-averages the images synthesized. Therefore, even in a case where the subject invites glare from a light such as in a case where a glossy paper or the like is captured, the pixel values in the area illuminated with the glare approximate to the pixel values achieved when there is no glare, making it possible to reduce the influence of the glare.

Further, the image processing device 25 synthesizes the images by predicting a motion vector by detecting a motion between the images. Therefore, even in a case where there are noises, etc. in the captured image, the high-pass components among the frequency components of the image are not lost, contributing to improving the S/N ratio.

That is, the image processing device 25 can neatly overlay the portions of the images where a character or the like appears, by synthesizing the images in accordance with such a method as described above. As a result, random CCD noises included in the images before being synthesized are averaged in the generated synthesized image, improving the S/N ratio.

In other words, even in a case where a sufficient time for exposure cannot be secured for each image captured, the exposure time for the synthesized image can be equated with the total sum of the exposure times for the images synthesized, resulting in producing the same effect as achieved when a sufficient exposure time is secured.

The present invention is not limited to the above-described embodiment, but can be carried out in various embodiments.

For example, according to the above-described embodiment, the image synthesis unit 2512 of the image processing device 25 reduces the influence of the glare from a light, by performing addition-averaging using the equation shown in FIG. 8C. However, the calculation method is not limited to this.

For example, the image synthesis unit 2512 may select the smallest value of the pixel value, by using an equation shown in FIG. 12A. In this case, since the pixel value P(U, V) obtained after the input image is subjected to keystone correction and the pixel value Q(U, V) of the output image include three components of R, G, and B, the image synthesis unit 2512 performs calculation for the respective components independently.

Further, for example, the image synthesis unit 2512 may obtain a parameter which indicates the light intensity of the light, from each of the pixels in the plurality of images. Then, the image synthesis unit 2512 may select pixel data that has the least glare, by comparing the pixels at the corresponding positions in the plurality of images based on the obtained parameters.

In this case, the image synthesis unit 2512 performs calculation for each pixel value by using an equation shown in FIG. 12B, for synthesizing the plurality of images.

In this equation, the function S is a scaling function for evaluating the degree of glare from the light. The values of S(P(U, V)) and S(Q(U, V)) represent the light intensity of the light when the digital camera 1 captures the subject.

Various functions are conceivable as the function S. For example, luminance value can be used, since the luminance value becomes larger as the light intensity of the light increases. Specifically, the function S is expressed by the following equation (5), by using the pixel values of the respective components R, G, and B of the input image.

$$S(P(U,V))=0.299R+0.587G+0.114B \qquad (5)$$

Alternatively, hue can be used, because the hue becomes smaller in accordance with increase in light intensity, which increase occurs in an area illuminated with the glare. Specifically, the function S is expressed by the following equation (6).

$$S(P(U,V))=\max(|-0.169R-0.500B|,|0.500R-0.419G-0.081B|) \qquad (6)$$

Yet alternatively, the image processing device 25 may perform image synthesis by using the equation shown in FIG. 12C. In this equation, N(U, V) represents the number of image synthesis has been performed, and the values TH_LOW and TH_HIGH represent predetermined thresholds. The function DS is expressed by the following equation (7).

$$DS(U,V)=S(P(U,V))-S(Q(U,V)) \qquad (7)$$

When the value of the function DS is positive, it means that the glare in the input image is large. Note that when initializing the synthesis process (step S12), the CPU 30 initializes all the values N(U, V) representing the number of times image synthesis has been performed, to 0.

The first line of the equation shown in FIG. 12C is employed in a case where the image concerned is the first image (N(U, V)=0), or in a case where the value of the function DS of coordinates (U, V) is smaller than the first threshold TH_LOW (DS(U, V)<TH_LOW). In these cases, the glare in the input image is very small. Thus, the image processing device 25 abandons the pixel value Q(U, V) of the synthesized image, and adopts the pixel value P(U, V) of the input image.

The second line of the equation shown in FIG. 12C shows a case where the input image is the second image or images thereafter (N(U, V)≠0) plus the glare in this input image is greatly large (DS(U, V)>TH_HIGH). The image processing device 25 adopts the pixel value Q(U, V) of the synthesized image.

The third line of the equation shown in FIG. 12C shows other cases than those described above. In this case, the image processing device performs addition-averaging.

Consequently, since only the pixels of the images that have smaller glare are added, an image having small glare can be synthesized while the S/N ratio is improved.

Yet further, a scale, which takes a spatial characteristic of the images, such as spatial frequency, into consideration, may be employed. In this case, not only the pixel values P(U, V) and Q(U, V) of coordinates (U, V) of a pixel, but also the pixel values of the whole image data or the values of the pixels surrounding that pixel are used to perform calculation. The scaling function may be expanded to a function SE(P, U, V), which includes the pixel value of the input image.

For example, an equation shown in FIG. 12D may be employed, which is an expanded version of the equation (5), for adding the pixel value of coordinates (U, V) concerned and the pixel values of (2N+1)×(2N+1) number of pixels surrounding the coordinates (U, V) concerned, which values are weighted based on Gaussian distribution (normal distribution) of the luminance in the area formed by these pixels.

In a case where a captured image has a high spatial frequency, the pixel value of a pixel concerned has little relation with the surrounding pixels. However, if the equation shown in FIG. 12D is used, the pixel value of the pixel concerned comes to have quite a relation with the surrounding pixels. Accordingly, even if a positional slide occurs between the images, it is possible to reduce any influence caused by the error due to the slide.

Further, since it is not that data of an image having a small luminance or data of an image having a strong color is preferentially selected, this results in the high-pass components of the image not being restricted, and a color image being generated which has a clear contour and a high contrast.

By using the function SE expressed by the equation shown in FIG. 12D in the image synthesis instead of the function S expressed by the equation shown in FIG. 12B, it is possible to reduce the glare in accordance with a selection method which takes a spatial factor into account.

Further, the following equation (8) may be used instead of the function DS expressed by the equation (7), as a selection addition-averaging method which takes a spatial factor into account. In this equation, the equation shown in FIG. 12D may be used as the function SE.

$$DS(U,V)=SE(P,U,V)-SE(Q,U,V) \qquad (8)$$

Accordingly, it becomes possible to finely reduce influence of the glare, while saving the high-pass frequency components.

According to the above-described embodiment, the explanation is based on the assumption that there is only one digital camera 1. However, there may be a plurality of digital cameras 1.

According to the above-described embodiment, a case has been explained where a character or the like is used as the subject, as shown in FIGS. 5A and 5B. However, the subject is not limited to characters, but may be a landscape or a human figure, which can also be synthesized in the same manner.

According to the above-described embodiment, it has been explained that the source from which the glare comes is a light. However, the glare source is not limited to this, but there are cases where environmental light from outdoors may come as the glare, to which cases the above-described embodiment can also be applied.

According to the above-described embodiment, it has been explained that the programs are pre-stored in the memory, etc. However, programs for controlling an image capture apparatus to function as the whole or a part of the apparatus, or to perform the above-described processes may be stored in a computer-readable recording medium such as a flexible disk, a CD-ROM (Compact Disk Read-Only Memory), a DVD (digital Versatile Disk), an MO (Magneto Optical disk), etc., to be distributed in the medium, so that the programs are installed in another computer thereby to control this computer to function as the above-described components or to perform the above-described processes.

Further, the programs may be stored in a disk device or the like included in a server apparatus on the Internet, so that, for example, the programs may be embedded in a carrier wave to be downloaded in a computer.

Second Embodiment

A second embodiment of the present invention is a document camera. Nowadays, a document camera apparatus is used, on which a document, a picture, or an article is placed so that it may be imaged by an imaging device, and the obtained video is projected by a projector or the like. This document camera apparatus might result in damaging the image quality of an obtained image, because when a document such as a picture is imaged, a light from the document illuminator is reflected on the document surface and causes a hotspot. This problem can be solved by applying the present invention to the document camera.

Figure 13:
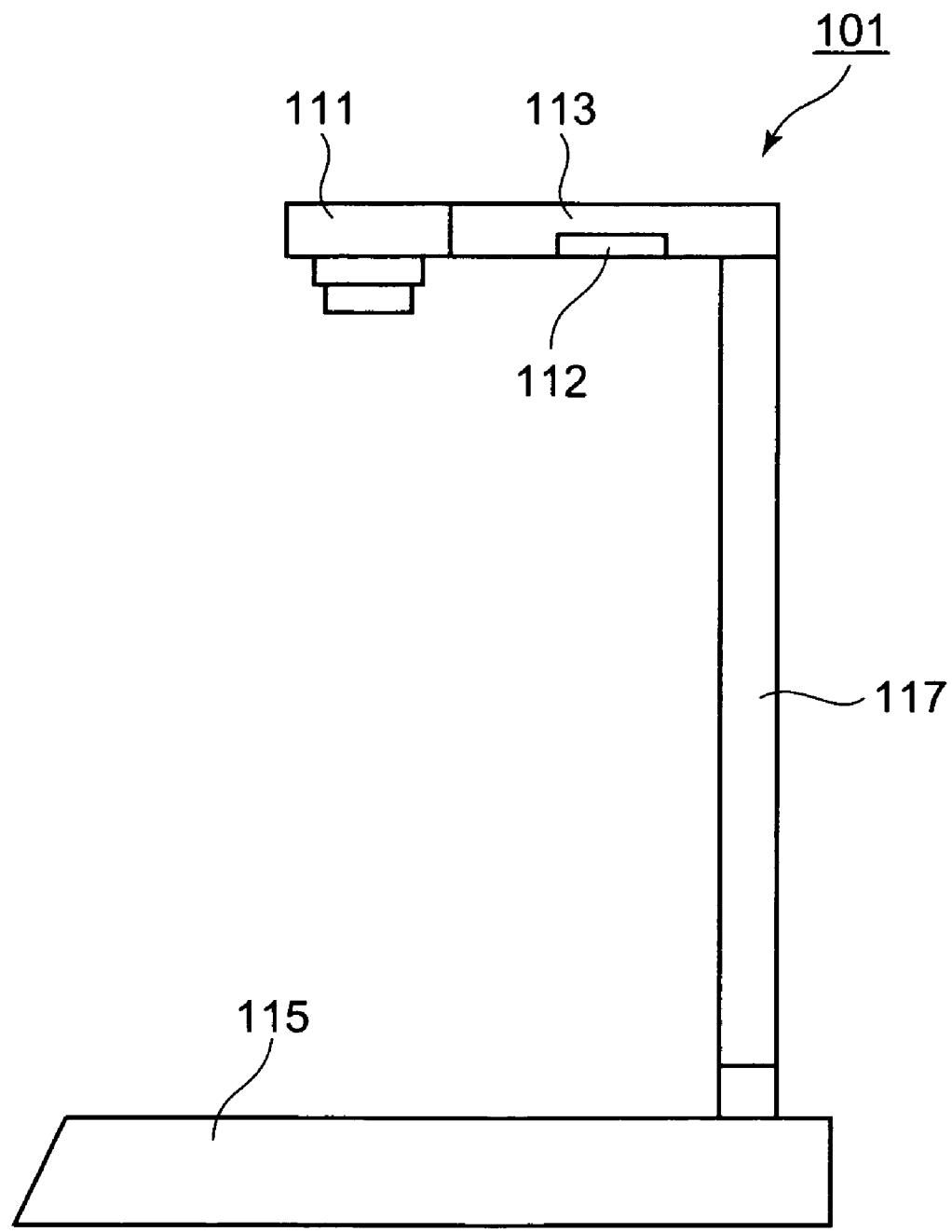
FIG. 13 is a side elevation showing one example of a document camera apparatus according to a second embodiment of the present invention.
Figure 14:
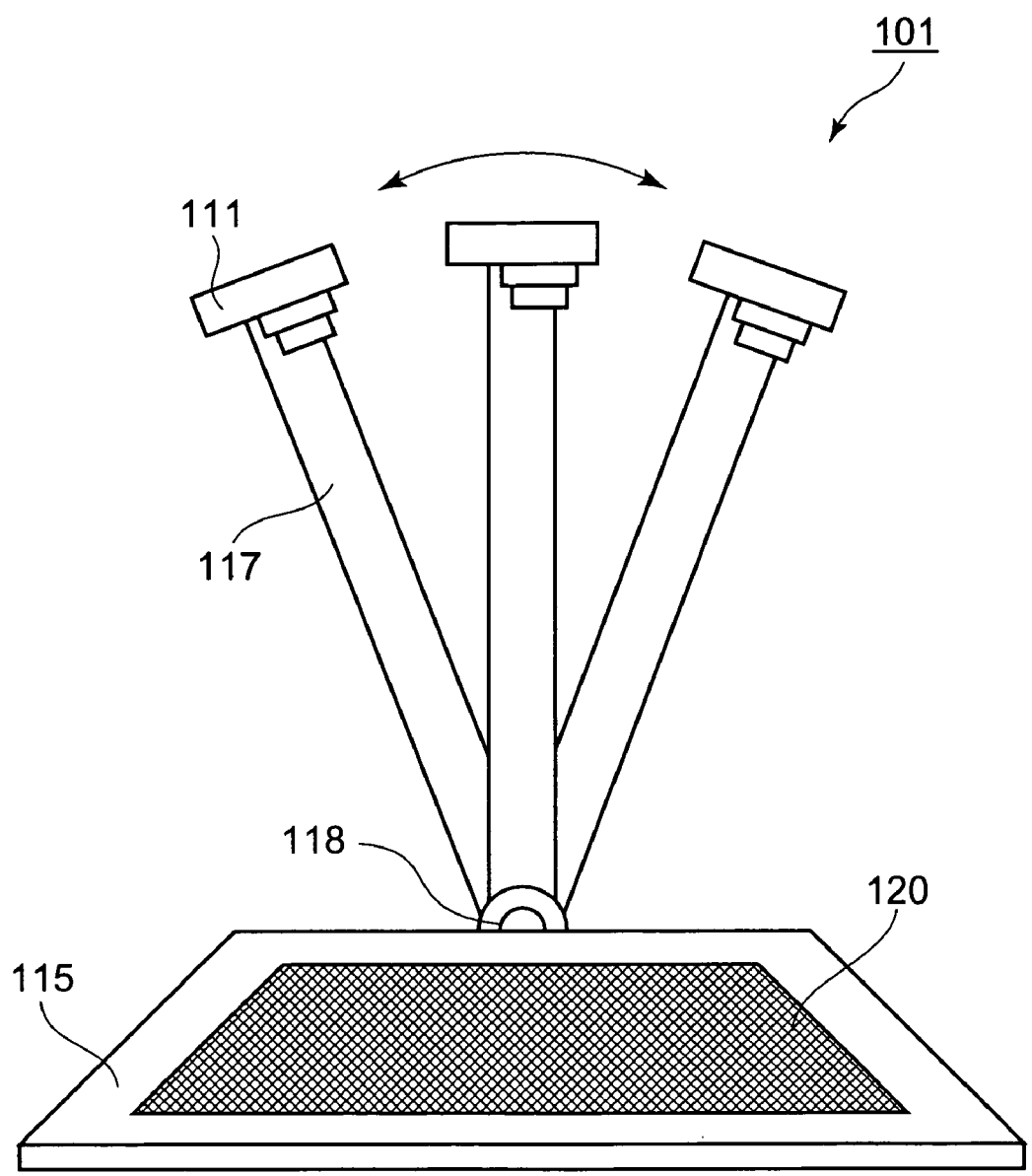
FIG. 14 is a front elevation showing one example of the document camera apparatus according to the second embodiment of the present invention.

An image capture apparatus according to the second embodiment of the present invention will now be explained with reference to the drawings. A document camera apparatus 101 is structured such that an arm 117 is rotatably attached to a base unit 115 used as a work surface, by a support axis 118, as shown in FIG. 13 and FIG. 14. A camera table 113 having an illuminator 112 in its lower surface is attached to the upper end of the arm 117. An imaging device 111 comprising a solid-state imaging device such as a CCD (Charge Coupled Device) is fixed on the camera table 113. For example, a digital camera is used as the imaging device 111.

The arm 117 can incline and swing about the support axis 118. The arm 117 can stand vertically or incline leftward and rightward at angles of typically 15 degrees, 30 degrees, and 45 degrees from the center of swing, which is set at a position on the upper surface of the base unit 115. The arm 117 is fixed by an unillustrated notch or stopper. The imaging device 111 can capture an image of the subject 120 such as a document, which is placed on the base unit 115, from different angles.

Figure 15:
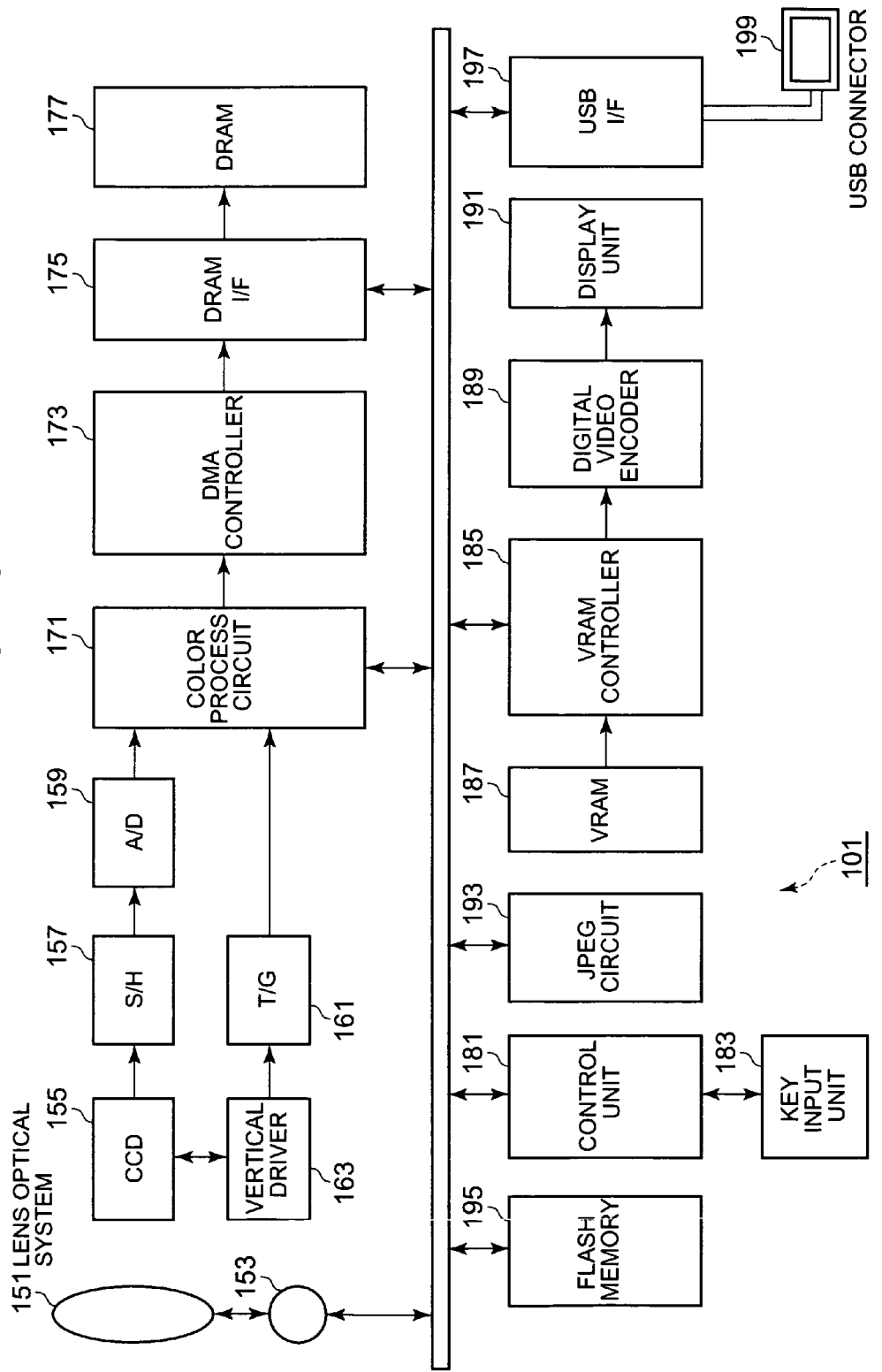
FIG. 15 is a block diagram for explaining the structure of an imaging device according to the second embodiment of the present invention.

The structure of the imaging device 111 is shown in FIG. 15, and will be detailed below.

The imaging device 111 includes a recording mode and a play mode as its operation mode.

In the recording mode, an imaging element 155 is driven by a timing generator 161 and a vertical driver 163 to perform scanning, thereby outputting data amounting to one frame of an opto-electric conversion result corresponding to an optical image converged, at each predetermined regular interval. This opto-electric conversion output, being in an analog signal state, is subjected to appropriate gain adjustment for respective primary colors of R, G, and B, sampled at a sample hold circuit 157, and converted into a digital signal at an analog-digital conversion circuit 159.

Then, a color process circuit 171 applies a color process including pixel interpolation and gamma correction to generate a luminance signal and color difference signals which are digital. The luminance signal and color difference signals are input to a direct memory access controller 173. The luminance signal and color difference signals are transferred by DMA to a DRAM 177 via a DRAM interface 175, in synchronization with the timing of a complex synchronization signal, a writing control signal, and a clock signal from the color process circuit 171.

A control unit 181 comprises a CPU, a ROM storing operation programs, a RAM used as a work memory, etc. The control unit 181 controls the operation of the imaging device 111 as a whole. After the luminance signal and color difference signals are transferred by DMA to the DRAM 177, the control unit 181 reads these signals from the DRAM 177, to perform a process for writing these signals in a VRAM 187 via a VRAM controller 185.

A digital video encoder 189 reads the luminance signal and color difference signals written in the VRAM 187, on a regular basis via the VRAM controller 185, to generate a video signal and output it to a display unit 191. As described above, in the recording mode, the imaging device 111 can display the optical image converged on the imaging element 155 (CCD, etc.) on the display unit 191 in real time.

When a shutter key of a key input unit 183 is pressed by the user, a trigger signal is input to the control unit 181. The control unit 181 performs a process for storing image data. In this image data storing process, the luminance signal and color difference signals amounting to one frame are written in the DRAM 177. After the DMA transfer takes place, the control unit 181 closes the path from the imaging element 155 to the DRAM 177, reads the signals mounting to one frame component by component in the unit of a basic block from the DRAM 177, and inputs them in a JPEG circuit 193.

The JPEG circuit 193 performs data compression in accordance with adaptive discrete cosine transformation, Huffman encoding, etc. The JPEG circuit 193 stores the compressed data for one frame as one file, in a flash memory 195, which is a non-volatile memory. At this time, data such as the file name, zooming magnification, data size, imaging conditions, etc. are recorded as the header information of the file. According to the present embodiment, the image data is converted into JPEG format by the JPEG circuit 193, but may be converted into other formats.

The flash memory 195 is, for example, a memory card to be detachably mounted in the imaging device 111 as its storage medium, or a built-in memory formed in the imaging device 111 beforehand, or the combination of such a memory card and built-in memory.

When the compressed luminance signal and color difference signals for one frame are recorded in the flash memory 195, the control unit 181 re-opens the operation through the imaging element 155 to the DRAM 177 and stores image data from the imaging element 155 in the DRAM 177. Further, the control unit 181 writes the image data in the VRAM 187 and again displays a monitor image on the display unit 191 in real time.

The key input unit 183 comprises, other than the shutter key, a power key, a mode switch, a menu key, a crosshair key, etc.

Next, in the play mode, the control unit 181 selectively reads image data stored in the flash memory 195, based on a key operation signal input from the key input unit 183. The JPEG circuit 193 expands the image data in accordance with a procedure reverse to the procedure for data compression in the recording mode. The control unit 181 writes the expanded image data in the DRAM 177 via the DRAM interface 175. Further, the control unit 181 writes the expanded image data in the VRAM 187 via the VRAM controller 185. Then, the control unit 181 displays the image on the display unit 191 by controlling a digital video encoder 189.

The control unit 181 sends image data stored in the flash memory 195 or data written in the DRAM 177 to an external apparatus which is connected to a USB connector 199, via a USB interface 197.

A process for imaging a subject 120 placed on the base unit 115, by using the imaging device 111 will be explained with reference to a flowchart shown in FIG. 16. First, the imaging device 111 lights the illuminator 112 in a state where the arm 117 is fixed vertically, and brings the center of a document or the like at a predetermined position right under the lens of the imaging device 111. Next, in a hotspot erasing mode, the imaging device 111 captures a first image in response to an operation of the shutter key (step S101). Then, the imaging device 111 inclines the arm 117 rightward or leftward to capture a second image (step S102).

Then, the control unit 181 performs a second image correction process for correcting the second image to a frontal view which is obtained when the image is captured from right in front of the target (step S103). Further, the control unit 181 performs an image synthesis process for correcting the hotspot area of the first image by using the image data of the second image (step S104). The control unit 181 performs a corrected image storing process for storing the corrected image data in a predetermined storage area (step S105). The control unit 181 performs a display process for displaying the corrected image (step S106).

Figure 17A:
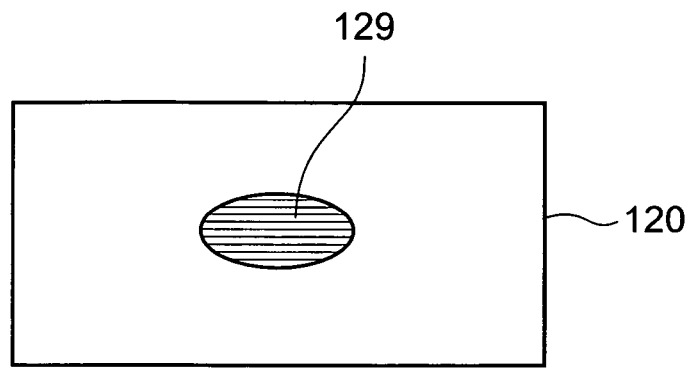
FIGS. 17A to 17C are diagrams exemplarily showing examples of image data sensed by the document camera apparatus according to the second embodiment.
Figure 17B:
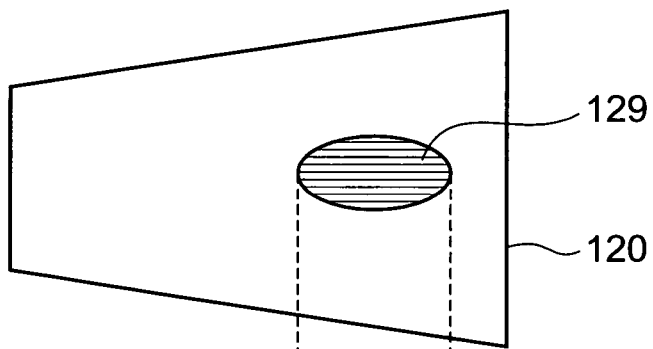

In the first image captured from in front of the subject 120, the subject 120 such as a picture, a document, etc. is imaged as, for example, a rectangle, as shown in FIG. 17A. In the image captured from an oblique direction deviated from the front forward direction, the subject 120 appear as a distorted quadrangle width on one side is larger than that on the opposite side, as shown in FIG. 17B.

In the first image captured from in front of the subject 120, a hotspot 129 due to the light from the illuminator 112 is produced at a position on the centerline of the subject 120. In the second image, the hotspot 129 appears at a position deviated to one side from right under the imaging device 111 or the illuminator 112.

Figure 18:
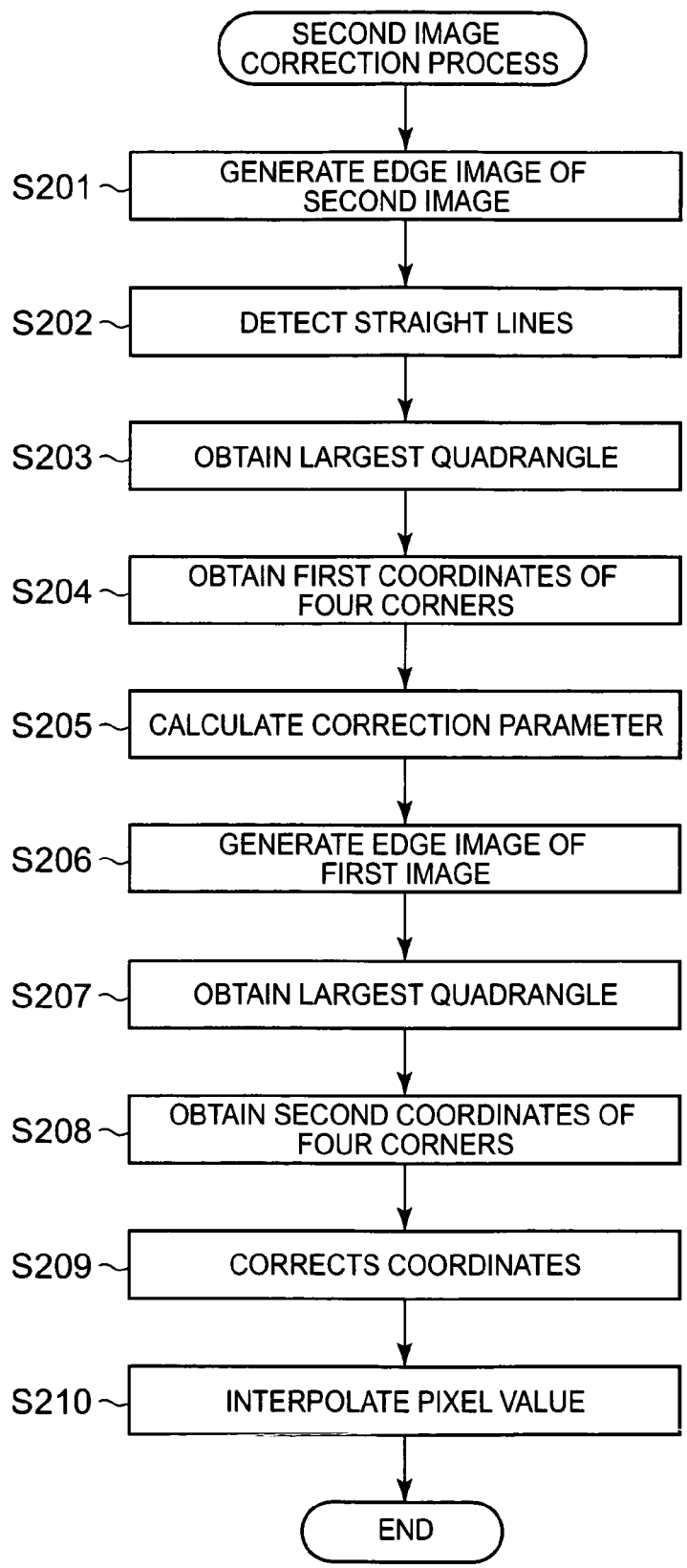
FIG. 18 is a flowchart showing a second image correction process.

Next, the second image correction process at step S103 will be explained with reference to a flowchart shown in FIG. 18. In this process, the control unit 181 performs keystone distortion correction for correcting the second image into a rectangular image obtained when the subject 120 is imaged from in front of it, and adjustment of the subject size.

First, the control unit 181 converts the second image into an edge image based on the luminance signal, to generate an edge image (step S201). Next, the control unit 181 detects straight lines from the edge image (step S202). The control unit 181 obtains the intersections of the detected straight lines, and obtains the largest quadrangle in the image (step S203). The control unit 181 obtains the coordinates (first coordinates) of the four corners of a rectangle, which is obtained when the detected largest quadrangle is seen from in front of it (step S204). The control unit 181 calculates a correction parameter for correcting the detected quadrangle into the rectangle (step S205).

The control unit 181 converts the first image into an edge image (step S206). The control unit 181 obtains the largest rectangle in this first edge image (step S207). Here, since the subject 120 in the first image has been captured from right above it, the shape of the subject 120 can be assumed to be a rectangle. The control unit 181 obtains the coordinates (second coordinates) of the four corners of this rectangle (step S208).

The control unit 181 compares the first coordinates obtained at step S204 with the second coordinates obtained at step S208, and performs coordinate correction for matching the first coordinates to the second coordinates (step S209). The control unit 181 brings the four corners of the keystone quadrangle in the second image to the corrected coordinates, and performs pixel interpolation on the image data (step S210).

Figure 17C:
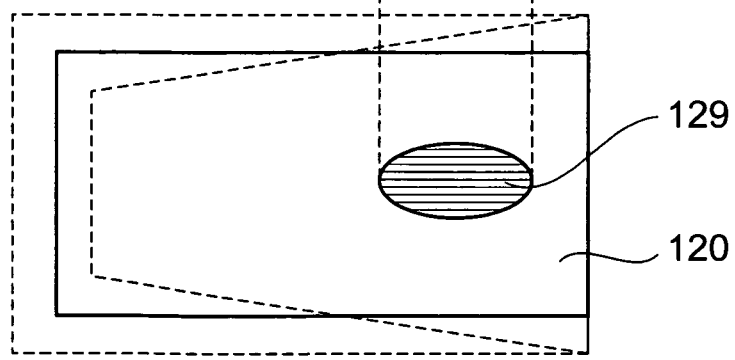

As obvious from the above, the second image including a distortion can be corrected to a rectangle by the keystone distortion correction, and the size of the subject 120 in the image can be adjusted so as to match the subject 120 in the first image by the matching of the coordinates of the four corners. For example, as shown in FIG. 17C, the coordinates of the four corners in the second image can be corrected to be matched with the coordinates of the four corners of the rectangle in the first image.

Figure 19:
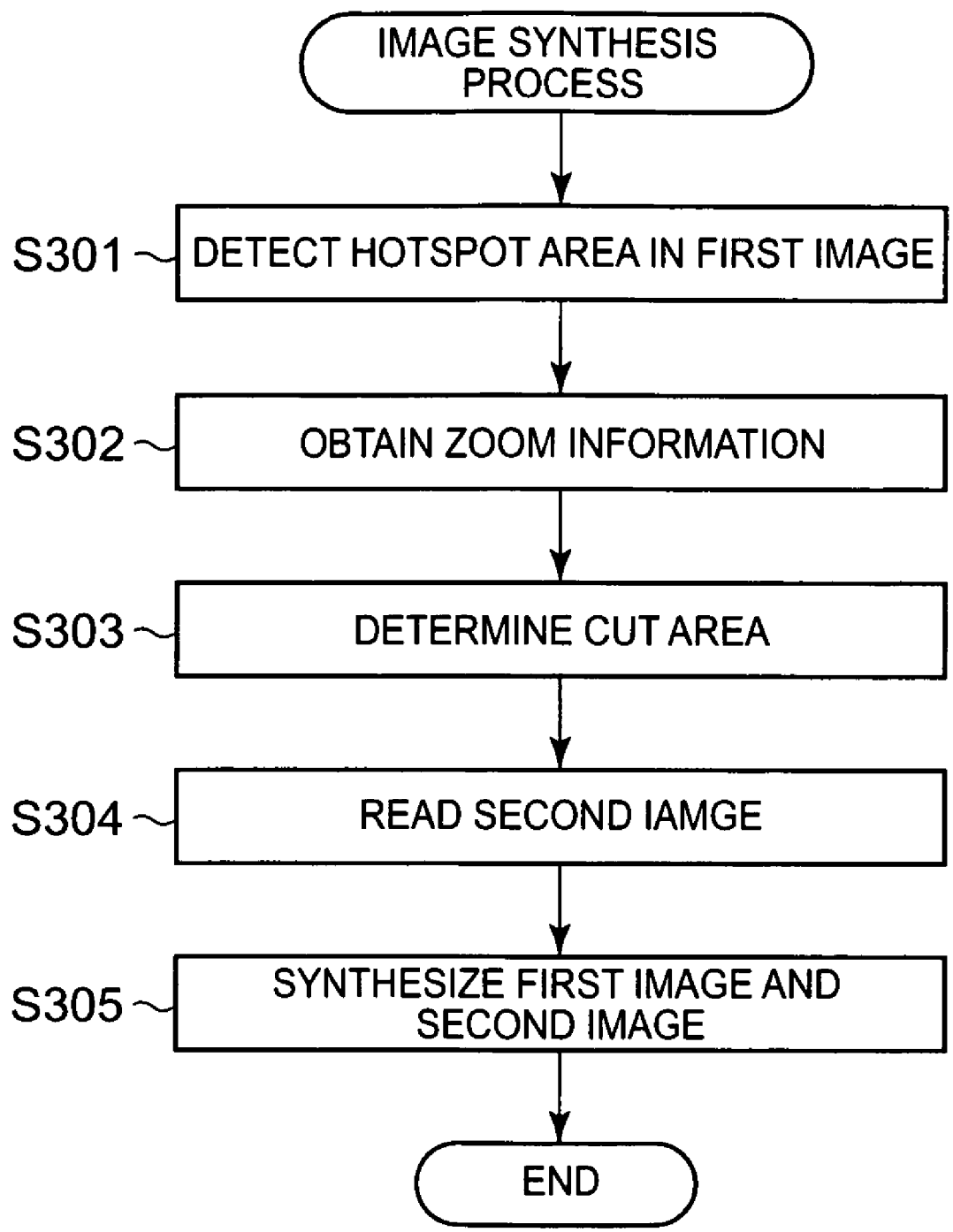
FIG. 19 is a flowchart showing an image synthesis process.
Figure 20:
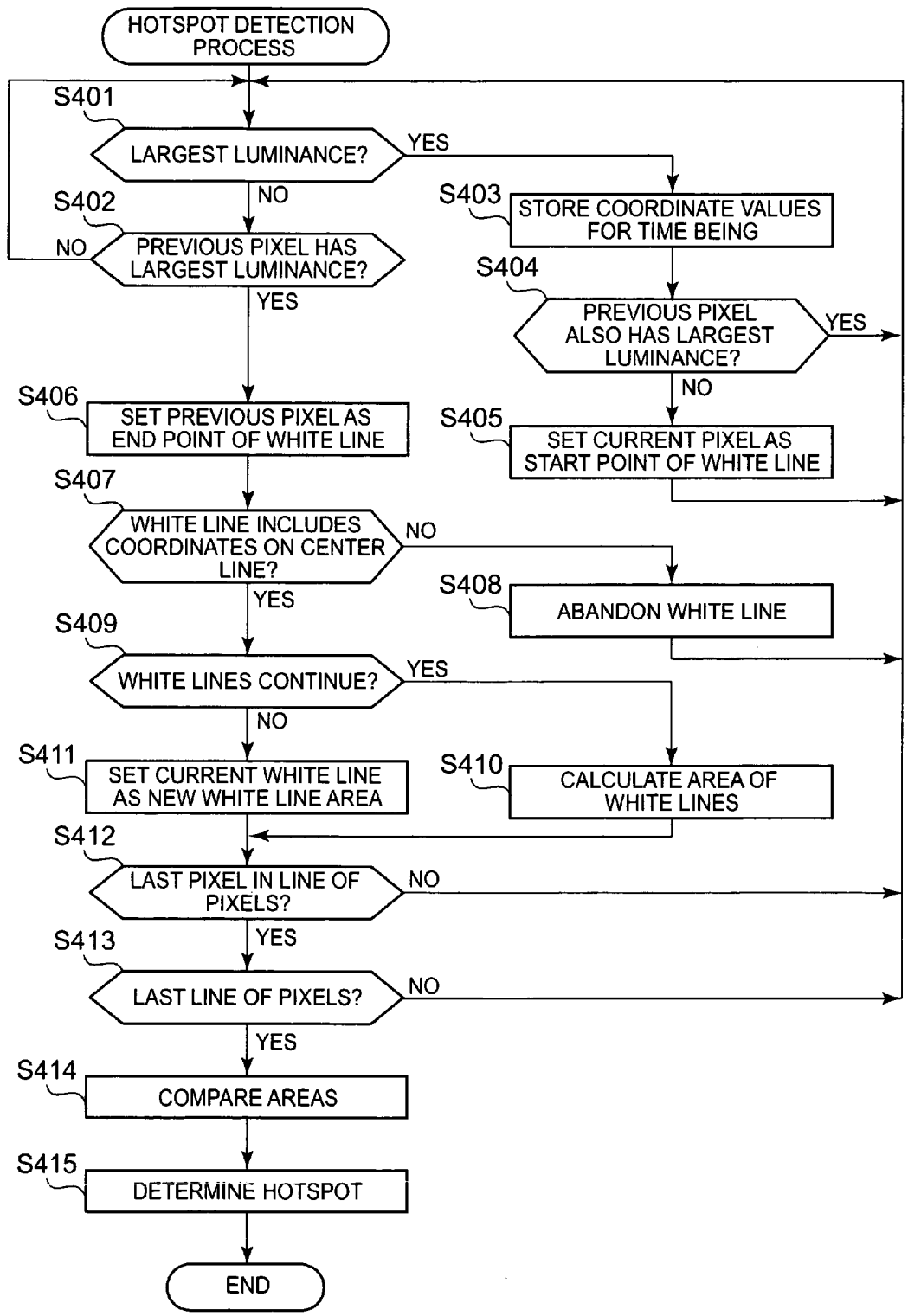
FIG. 20 is a flowchart showing a hotspot detection process.

Next, the image synthesis process at step S104 for synthesizing the first image and the second image will be explained by using flowcharts shown in FIG. 19 and FIG. 20. First, the control unit 181 detects a hotspot area in the first image (step S301).

Specifically, the control unit 181 sets a check area in the image, and sequentially checks the luminance signal level of the pixels in the image from its first pixel. First, the control unit 181 determines whether the pixel now being focused has the largest luminance or not (step S401). In a case where the pixel does not have the largest luminance (step S401; NO), the control unit 181 determines whether the previous pixel has the largest luminance or not (step S402). In a case where the previous pixel has the largest luminance (step S402; YES), the control unit 181 goes to step S406. In a case where the previous pixel does not have the largest luminance (step S402; NO), the control unit 181 returns to step S401.

To the contrary, in a case where the pixel now being focused has the largest luminance (step S401; YES), the control unit 181 determines to store the coordinates of this pixel for the time being (step S403). Next, the control unit 181 determines whether the previous pixel also has the largest luminance or not (step S404). In a case where the previous pixel does not have the largest luminance (step S404; NO), the control unit 181 sets the coordinates of the pixel now being focused, as the start point of a white line (step S405). In a case where the previous pixel also has the largest luminance (step S404; YES), the flow returns to step S401.

In a case where the previous pixel has the largest luminance at step S402 (step S402; YES), the control unit 181 sets the coordinates of the previous pixel as the end point of the white line (step S406). Then, the control unit 181 determines whether the white line includes coordinates on a center line or not (step S407). In a case where the white line includes no coordinates on the center line (step S407; NO), the control unit 181 abandons the data of this white line (step S408), and returns to step S401.

In a case where the white line includes coordinates on the center line at step S407 (step S407; YES), the control unit 181 determines whether the previous line of pixels also has any white line appear at the position corresponding to the coordinates on the center line included in the white line or not (step S409). In a case where white lines continue over the two lines of pixels (step S409; YES), the control unit 181 adds the length of the current white line to the length of the white line in the previous line of pixels, to calculate the area occupied by the white lines (step S410). In a case where there are no continuous white lines (step S409; NO), the control unit 181 determines that the white line in the current line of pixels is a new white line area, and records the length of this white line (step S411).

Next, the control unit 181 determines whether the pixel now being focused is the last pixel in the line of pixels or not (step S412). In a case where the pixel is not the last one (step S412; NO), the control unit 181 returns to step S401. In a case where the pixel is the last one (step S412; YES), the control unit 181 determines whether the line of pixels now being focused is the last line or not (step S413). In a case where the line of pixels is not the last one (step S413; NO), the control unit 181 returns to step S401.

In a case where the line of pixels is the last line at step S413 (step S413; YES), that is, in a case where the checking has reached the last pixel in the last line of pixels, the control unit 181 compares the areas of the white line areas (step S414). The control unit 181 determines a white line area, which has the largest area, as a hotspot 129 (step S415).

In this manner, the control unit 181 performs a hotspot detection process at step S301.

Figure 21A:
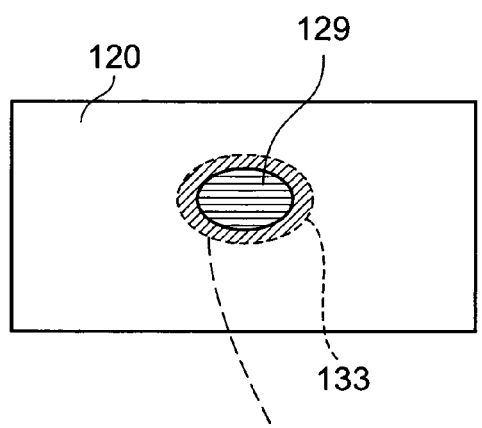
FIGS. 21A to 21C are diagrams exemplarily showing image data synthesized in the image synthesis process.

Next, the control unit 181 obtains zoom information (step S302). The control unit 181 determines a cut area 131 as shown in FIG. 21A (step S303).

Specifically, since the present document camera apparatus 101 can keep the distance between the imaging device 111 and the base unit 115 constant by means of the arm 117, a range in a captured imaged of the subject 120, that is illuminated by the illuminator 112 is fixed, and the size of the hotspot 129 in the captured image can be determined if the range of view of the imaging device 111 is specified based on the zooming magnification. Hence, the position and size of the hotspot 129 and area around the hotspot 129 are stored in advance in association with the zooming magnification to determine the cut area 131 including the hotspot 129 and therearound.

Figure 21B:
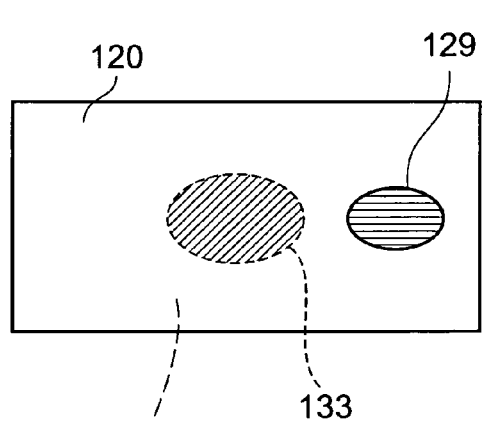
Figure 21C:
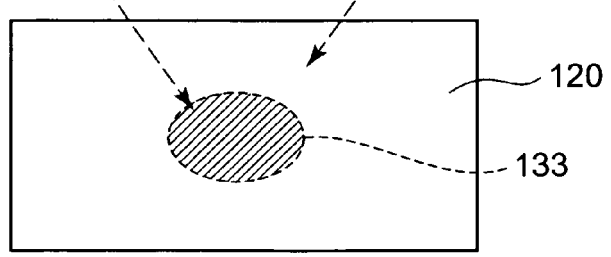

The cut area 131 of the first image is thus determined. The control unit 181 reads image data of an area 133 in the second image having been subjected to keystone distortion correction as shown in FIG. 21B, which area 133 corresponds to the cut area 131 (step S304). The control unit 181 synthesizes the image data by replacing the data of the cut area 131 in the first image with the read image data of the second image, as shown in FIG. 21C (step S305). As a result, an image having not hotspot 129 is generated.

In the image synthesis process, the data of the first image and that of the second image, having been stored in the flash memory 195 by the control unit 181, are expanded by the JPEG circuit 193, and the expanded first image data and second image data are written in the DRAM 177 by the control unit 181. The control unit 181 may store new image data to which the second image data has been synthesized in the DRAM 177, and may newly store it in the flash memory 195 via the JPEG circuit 193. The control unit 181 may continue to retain the data of the first image and second image, in such a manner as to store the keystone distortion correction information and the interpolation information obtained by the adjustment of the subject size in the header information of the second image file, and the information regarding the cut area 131 of the first image in the header information of the first image file.

By storing the new image data obtained by erasing the hotspot 129 as described above, it is possible to display a beautiful image having a high image quality in which no hotspot 129 is included on the display unit 191, and display such an image on the screen of an external computer, or project such an image by a projector, which computer or projector is connected to the USB connector 199. Further, by continuing to retain the image data before and after the hotspot 129 is erased, it is possible for the user to obtain a beautiful image having a high image quality in which no hotspot 129 is included, whenever the user likes.

Various modifications based on the second embodiment are available.

Figure 22A:
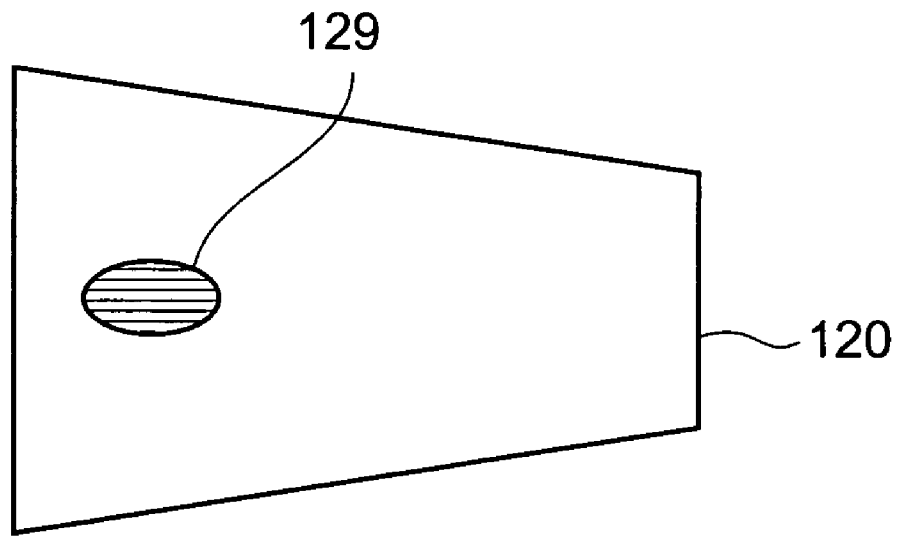
FIGS. 22A and 22B are diagrams exemplarily showing images in a modification of the image synthesis process according to the second embodiment.
Figure 22B:
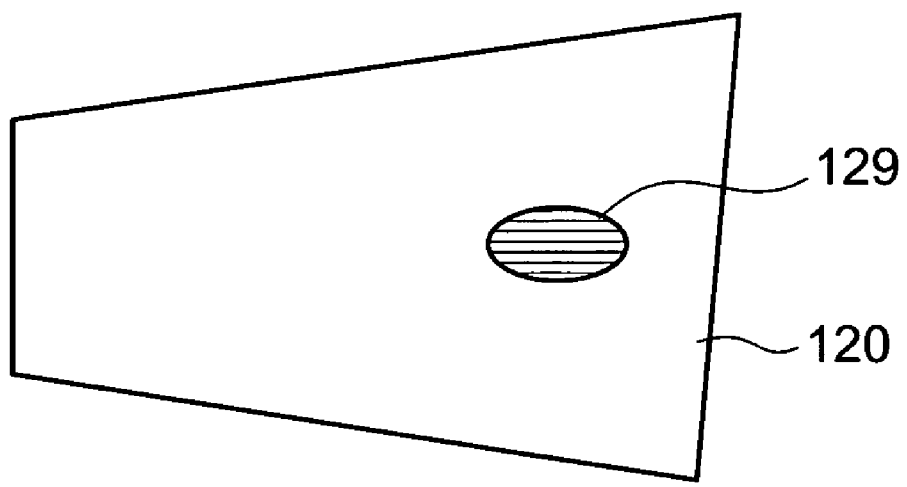

According to the second embodiment, the first image is captured from in front of the subject 120. However, both the first and second images of the subject 120 may be captured from oblique directions to erase the hotspot 129. For example, the same single subject 120 is imaged from the leftwardly inclined position and rightwardly inclined position of the arm 117 shown in FIG. 14. In this case, even if the subject 120 has a rectangular shape, a distorted image whose width on the left side is larger than that on the right side as shown in FIG. 22A, and a distorted image whose width on the right side is larger than that on the left side as shown in FIG. 22B are obtained.

Figure 23:
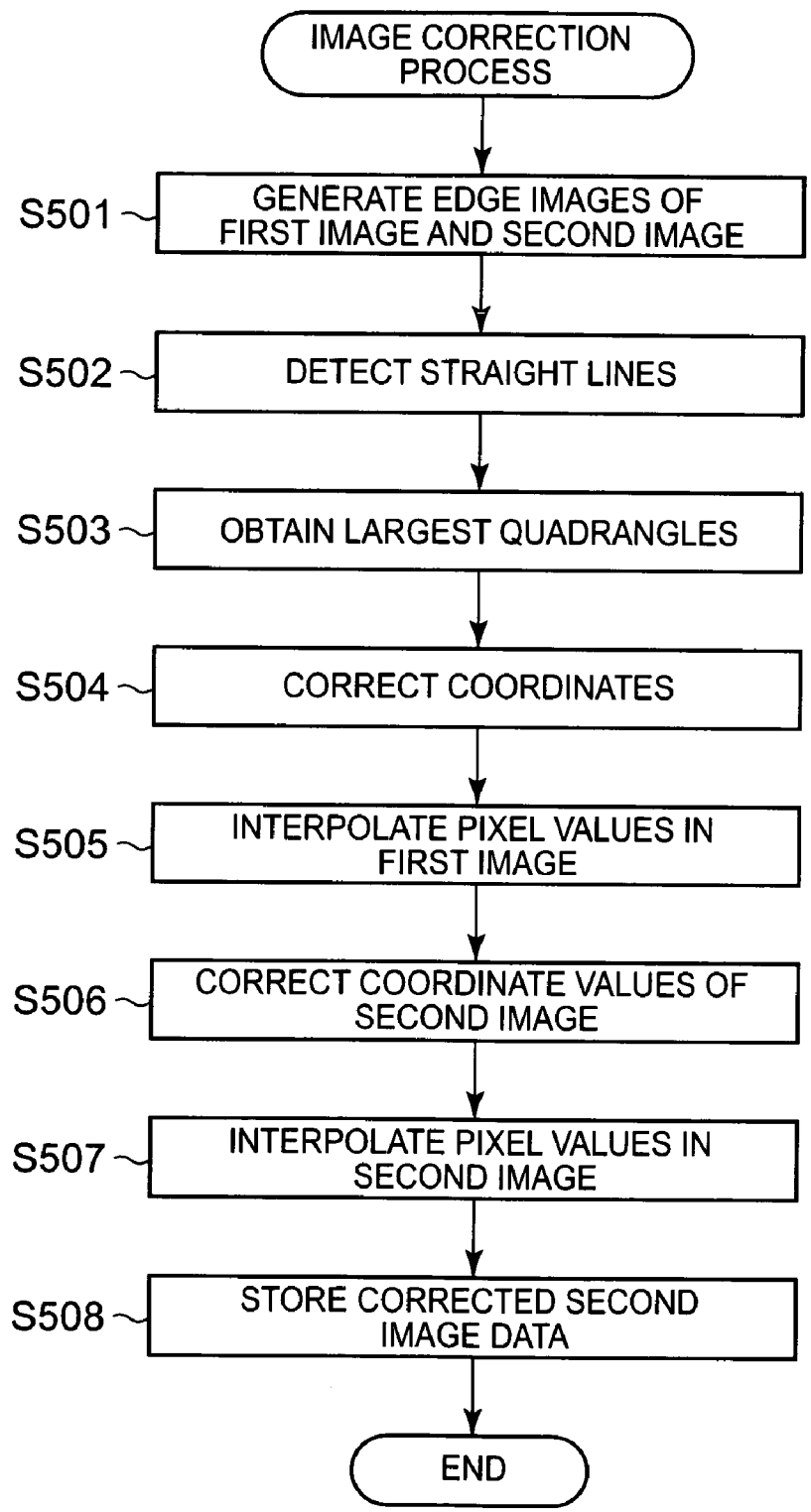
FIG. 23 is a flowchart showing an image correction process.

FIG. 23 is a flowchart for explaining an image correction process to be performed in the present modification. First, the control unit 181 generates edge images of first and second images (step S501). Next, the control unit 181 detects straight lines in the edges images in the manner described above (step S502). The control unit 181 obtains the intersections of the detected straight lines to obtain the largest quadrangles (step S503). The control unit 181 obtains the coordinates of the four corners of the obtained quadrangles to correct the coordinates such that the four corners will be the corners of rectangles (step S504). The control unit 181 interpolates the pixel values of the first image in the manner described above, to correct the first image into a rectangle obtained when the subject 120 is captured from in front of it (step S505).

The control unit 181 corrects the coordinates of the four corners of the rectangle of the second image obtained at step S504 so as to be matched with the coordinates of the four corners of the rectangle of the first image (step S506). The control unit 181 interpolates the pixel values in the second image, so that the second image will be corrected to a rectangle obtained when the subject 120 is captured from in front of it, so as to be brought to the corrected coordinates of the four corners (step S507). The control unit 181 stores the data of the corrected second image in the VRAM 187 (step S508). The control unit 181 thus can output an image having been image-processed, to the display unit 191.

Another modification to which the second embodiment is applied will be explained. A first image and a second image obtained by capturing the same single subject 120 can be synthesized to produce a rectangle obtained when the subject is seen from in front of it, by subjecting the first and second images to keystone distortion correction and adjustment of the subject size, for example, in a manner described in FIG. 24.

FIG. 25 is a flowchart for explaining an image correction process performed in the present modification. First, the control unit 181 detects a hotspot 129 included in the first image (step S601). Then, the control unit 181 calculates the coordinates of the center of the detected hotspot 129 (step S602).

For example, the control unit 181 detects continuation of pixels having the largest luminance from all over the first image, to locate a hotspot 129 where there is an area in which white lines are continuous lengthwise and widthwise and which has the largest area. Then, the control unit 181 determines the coordinates of the median point of the detected white line area as the coordinates of the center of the hotspot 129.

Figure 24:
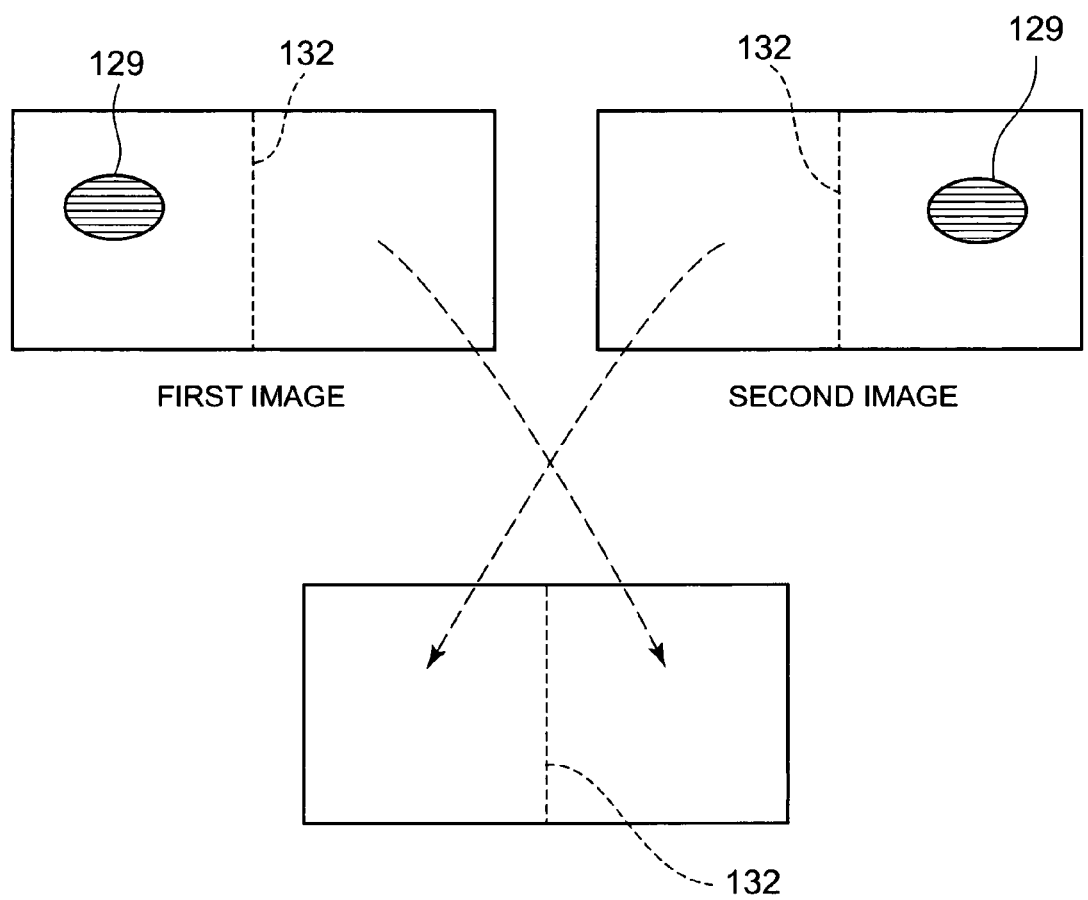
FIG. 24 is a diagram exemplarily showing images corrected in the image correction process.

Likewise, the control unit 18 detects continuation of pixels having the largest luminance form the second image to detect a hotspot 129 (step S603). Then, the control unit 181 calculates the coordinates of the center of the hotspot 129 in the second image (step S604). Further, the control unit 181 obtains a center line 132 that is positioned at a mid point between the coordinates of the center of the hotspot 129 in the first image and the coordinates of the center of the hotspot 129 in the second image (step S605). Then, the control unit 181 cuts the first image and second image along the center line 132 and synthesizes an image from which the hotspot 129 is erased, as shown in FIG. 24 (step S606).

As described above, the imaging device 111 can obtain a beautiful image by erasing the hotspot 129. In the above-described examples, two images are synthesized so as to erase a detected hotspot 129. Alternatively, two images may be synthesized so as to replace an image portion of a first image (or a second image) that is poor in image quality with the second image (or the first image) having a better image quality.

Figure 26A:
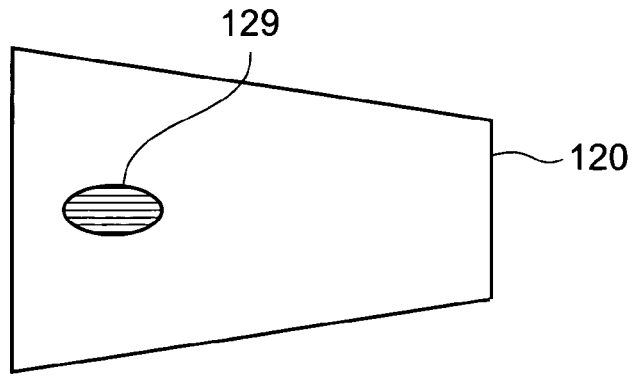
FIGS. 26A to 26C are diagrams exemplarily showing examples of image data imaged by the document camera apparatus according to the present invention.
Figure 26B:
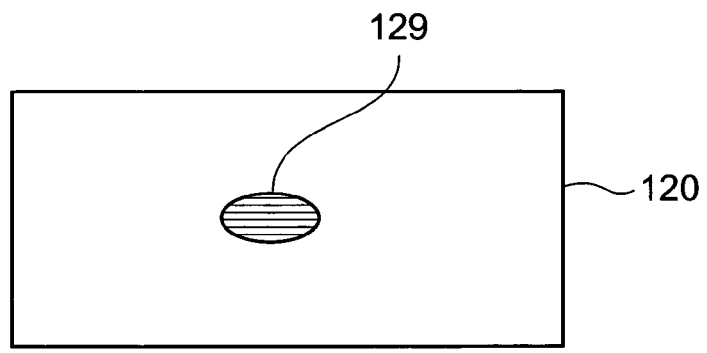
Figure 26C:
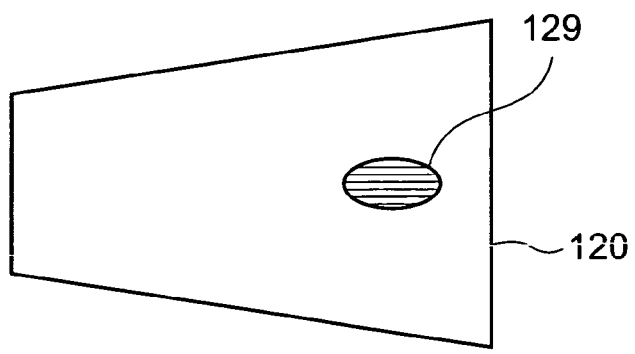

Yet another modification to which the second embodiment is applied will be explained. According to the present modification, the imaging device 111 captures the same single subject 120 from three directions, namely from in front of the subject 120, from left, and from right, and obtains a first image shown in FIG. 26A, a second image shown in FIG. 26B, and a third image shown in FIG. 26C.

The control unit 181 applies the above-described keystone distortion correction and adjustment of the subject size to the first image and the third image, in order to obtain image data having the same as the second image. According to this method, the imaging device 111 not only can automatically erase the hotspot 129, but also can synthesize the three images by selecting desirably imaged portions from the three images.

As having been described above, the present imaging device 111 can record and display a beautiful video having a high image quality, by performing keystone distortion correction and image synthesis of the images captured by a digital camera or the like.

It is preferable that the lens of the imaging device 111 can be fixed at a position right above the center of the base unit 115, for capturing the subject 120 such as a picture, a document, etc. which is placed on the based unit 115. Further, it is preferable that the arm 117 be attached on the base unit 115 such that the distance between the center of the base unit 115 and the imaging device 111 is not varied when the arm 117 is swung left and right. It is preferable that a guide line that makes it easier to place a subject such as a rectangular standard-sized document on the base unit 115 to bring the center of the target at the center of the base unit 115, be laid on the upper surface of the base unit 115.

The image correction process such as keystone distortion correction may be applied to an image that is captured by standing the arm 117 vertically on the base unit 115. With this configuration, an image which seems as if the subject 120 were captured from in font of it can be obtained, even in a case where the center of the subject 120 such as a document is not positioned right under the lens of the imaging device 111. This further enables the user to place the subject 120 such as a document on the base unit 115 or replace it with another object, without care for the position at which the subject 120 is to be placed.

The subject 120 is not limited to a planar object such as a poster, a picture, a document, etc., but a three-dimensional subject 120 can also be imaged. The above-described processes can be realized not only by executing programs stored in a ROM of the imaging device 111 which is fixed on the camera table 113, but also by transferring image data from the imaging device 111 to another computer that is connected by a USB cable or the like to the imaging device 111 fixed on the camera table 113, so that this computer may perform the above-described processes.

Figure 27:
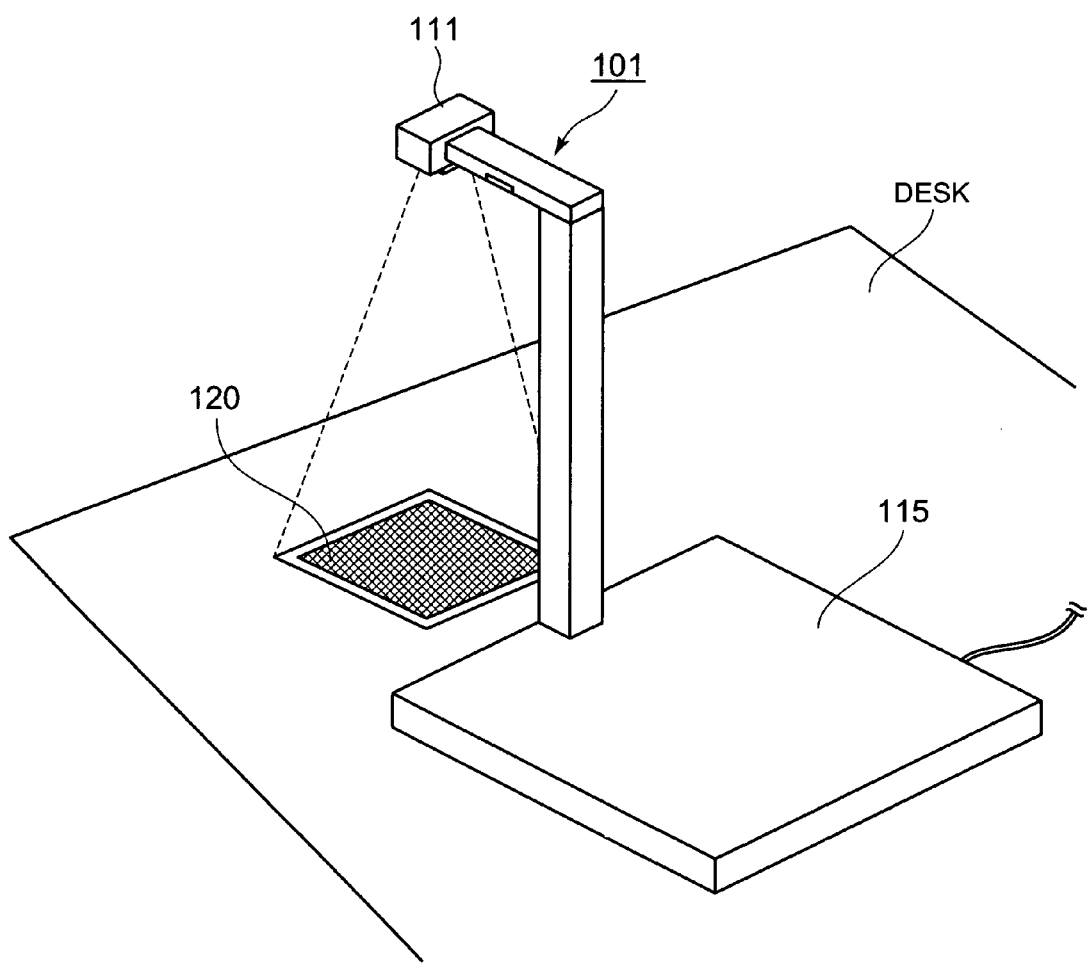
FIG. 27 is a diagram in which a document is placed on the surface of a desk on which a document camera is set.

In the above-described embodiment, the base unit 115 is used as the work surface. Alternatively, the subject 120 may be placed on the surface of a desk on which the document camera apparatus 101 is set, as shown in FIG. 27.

According to the above-described embodiment, it has been explained that the programs are pre-stored in the memory, etc. However, programs for controlling an imaging device to function as the whole or a part of the device, or to perform the above-described processes may be stored in a computer-readable recording medium such as a flexible disk, a CD-ROM (Compact Disk Read-Only Memory), a DVD (digital Versatile Disk), an MO (Magneto Optical disk), etc., to be distributed in the medium, so that the programs are installed in another computer thereby to control this computer to function as the above-described components or to perform the above-described processes.

Further, the programs may be stored in a disk device or the like included in a server apparatus on the Internet, so that, for example, the programs may be embedded in a carrier wave to be downloaded in a computer.

Various embodiments and changes may be made thereunto without departing from the broad spirit and scope of the invention. The above-described embodiments are intended to illustrate the present invention, not to limit the scope of the present invention. The scope of the present invention is shown by the attached claims rather than the embodiments. Various modifications made within the meaning of an equivalent of the claims of the invention and within the claims are to be regarded to be in the scope of the present invention.

This application is based on Japanese Patent Application No. 2005-099226 filed on Mar. 30, 2005 and Japanese Patent Application No. 2005-103402 filed on Mar. 31, 2005 and including specification, claims, drawings and summary. The disclosure of the above Japanese Patent Application is incorporated herein by reference in its entirety.

What is claimed is:

1. An image capture apparatus for capturing an image of a subject, comprising:
    a correction unit which corrects distortion of a shape of a subject in a plurality of captured images obtained by shooting the subject from different directions, to obtain distortion-corrected images;
    an image synthesis unit which performs a predetermined calculation for each pixel in the plurality of distortion-corrected images obtained by the correction unit in order to reduce a change in a pixel value which is caused by glare from a light, and synthesizes a corrected image from the plurality of distortion-corrected images;
    wherein the image synthesis unit:
        obtains a parameter indicating an intensity of a light when the subject is shot for each pixel from a first image and a second image which are to be synthesized, and obtains a difference obtained by subtracting a value of the parameter of the first image from a value of the parameter of the second image for each pixel;
        selects a pixel value of the second image to be a pixel value of a synthesized image, in a first case in which the obtained difference is smaller than a preset first threshold;
        selects a pixel value of the first image to be a pixel value of a synthesized image, in a second case in which the first image is already a synthesized image having been synthesized before, and the obtained difference is larger than a preset second threshold; and
        selects a value obtained by averaging the pixel value of the first image and the pixel value of the second image based on a number of times image synthesis has been performed, to be a pixel value of a synthesized image, in cases other than the first and second cases,
        thereby to synthesize the corrected image from the plurality of distortion-corrected images.

2. The image capture apparatus according to claim 1, wherein the parameter indicating the intensity of the light when the subject is shot is obtained for each pixel based on a luminance value for the pixel.

3. The image capture apparatus according to claim 1, wherein the parameter indicating the intensity of the light when the subject is shot is obtained for each pixel based on a hue value for the pixel.

4. The image capture apparatus according to claim 1, wherein the parameter indicating the intensity of the light when the subject is shot is obtained for each pixel based on the pixel value of the pixel and pixel values of pixels in an area surrounding the pixel.

5. The image capture apparatus according to claim 1, further comprising:

a base unit;

an arm axially supported by the base unit in a free-to-swing state; and an imaging unit and an illuminator which are set on an upper portion of the arm.

6. An image processing method, performed by an image capture apparatus for capturing an image of a subject, the method comprising:

shooting the subject from different directions, and correcting distortion of a shape of the subject in a plurality of images obtained by the shooting to obtain a plurality of distortion-corrected images; and performing a predetermined calculation for reducing a change in a pixel value caused by glare from a light, and synthesizing a corrected image from the plurality of distortion-corrected images;

wherein performing the predetermined calculation and synthesizing the corrected image comprises:

obtaining a parameter indicating an intensity of a light when the subject is shot for each pixel from a first image and a second image which are to be synthesized, and obtaining a difference obtained by subtracting a value of the parameter of the first image from a value of the parameter of the second image for each pixel;

selecting a pixel value of the second image to be a pixel value of a synthesized image, in a first case in which the obtained difference is smaller than a preset first threshold;

selecting a pixel value of the first image to be a pixel value of a synthesized image, in a second case in which the first image is already a synthesized image having been synthesized before, and the obtained difference is larger than a preset second threshold; and selecting a value obtained by averaging the pixel value of the first image and the pixel value of the second image based on a number of times image synthesis has been performed, to be a pixel value of a synthesized image, in cases other than the first and second cases, thereby synthesizing the corrected image from the plurality of distortion-corrected images.

7. A tangible computer-readable recording medium storing a program that is executable by a computer to cause the computer to function as:

a correction unit which corrects distortion of a shape of a subject in a plurality of captured images obtained by shooting the subject from different directions, to obtain a plurality of distortion-corrected images; and an image synthesis unit which performs a predetermined calculation for reducing a change in a pixel value caused by glare from a light, and synthesizes a corrected image from the plurality of distortion-corrected images;

wherein the image synthesis unit:

obtains a parameter indicating an intensity of a light when the subject is shot for each pixel from a first image and a second image which are to be synthesized, and obtains a difference obtained by subtracting a value of the parameter of the first image from a value of the parameter of the second image for each pixel;

selects a pixel value of the second image to be a pixel value of a synthesized image, in a first case in which the obtained difference is smaller than a preset first threshold;

selects a pixel value of the first image to be a pixel value of a synthesized image, in a second case in which the first image is already a synthesized image having been synthesized before, and the obtained difference is larger than a preset second threshold; and selects a value obtained by averaging the pixel value of the first image and the pixel value of the second image based on a number of times image synthesis has been performed, to be a pixel value of a synthesized image, in cases other than the first and second cases, thereby to synthesize the corrected image from the plurality of distortion-corrected images.

* * * * *